United States Patent
Noda

(10) Patent No.: US 10,859,365 B2
(45) Date of Patent: Dec. 8, 2020

(54) METHOD FOR CONTROLLING SHAPE MEASURING APPARATUS

(71) Applicant: Mitutoyo Corporation, Kanagawa (JP)

(72) Inventor: Takashi Noda, Shimotsuke (JP)

(73) Assignee: MITUTOYO CORPORATION, Kawasaki (JP)

( * ) Notice: Subject to any disclaimer, the term of this patent is extended or adjusted under 35 U.S.C. 154(b) by 233 days.

(21) Appl. No.: 16/123,867

(22) Filed: Sep. 6, 2018

(65) Prior Publication Data

US 2019/0078865 A1 Mar. 14, 2019

(30) Foreign Application Priority Data

Sep. 8, 2017 (JP) .................................. 2017-173575

(51) Int. Cl.
*G01B 5/008* (2006.01)
*G05B 19/401* (2006.01)

(52) U.S. Cl.
CPC ............ *G01B 5/008* (2013.01); *G05B 19/401* (2013.01)

(58) Field of Classification Search
CPC ...... G05B 19/401; G01B 5/008; G01B 21/04; G01B 21/20; G01Q 10/045
See application file for complete search history.

(56) References Cited

U.S. PATENT DOCUMENTS

| 2008/0236260 | A1* | 10/2008 | Noda | G01B 5/008 73/105 |
| 2013/0310962 | A1* | 11/2013 | Noda | G01B 21/04 700/97 |
| 2014/0025336 | A1* | 1/2014 | Noda | G01B 21/20 702/168 |
| 2017/0074901 | A1* | 3/2017 | Humphris | G01Q 10/045 |

FOREIGN PATENT DOCUMENTS

| JP | 2008-241420 | 10/2008 |
| JP | 2013-238573 | 11/2013 |
| JP | 2014-021004 | 2/2014 |
| JP | 6063161 | 1/2017 |

* cited by examiner

*Primary Examiner* — Regis J Betsch
*Assistant Examiner* — Kaleria Knox
(74) *Attorney, Agent, or Firm* — Rankin, Hill & Clark LLP

(57) ABSTRACT

There is provide a method for controlling a shape measuring apparatus that synchronize an acceleration/deceleration changing timing of a velocity pattern with a control sampling cycle, and prevents a control lag.
Based on a shape of a movement path set based on preliminarily-obtained shape data of an object to be measured, a velocity pattern for a probe to move along the movement path.
It is determined whether a velocity changing timing of the velocity pattern is synchronized with a control sampling cycle of a shape measuring apparatus.
When the velocity changing timing of the velocity pattern is not synchronized with the control sampling cycle, the veloc- (Continued)

ity pattern is corrected such that the velocity changing timing of the velocity pattern is synchronized with the control sampling cycle of the shape measuring apparatus.

6 Claims, 31 Drawing Sheets

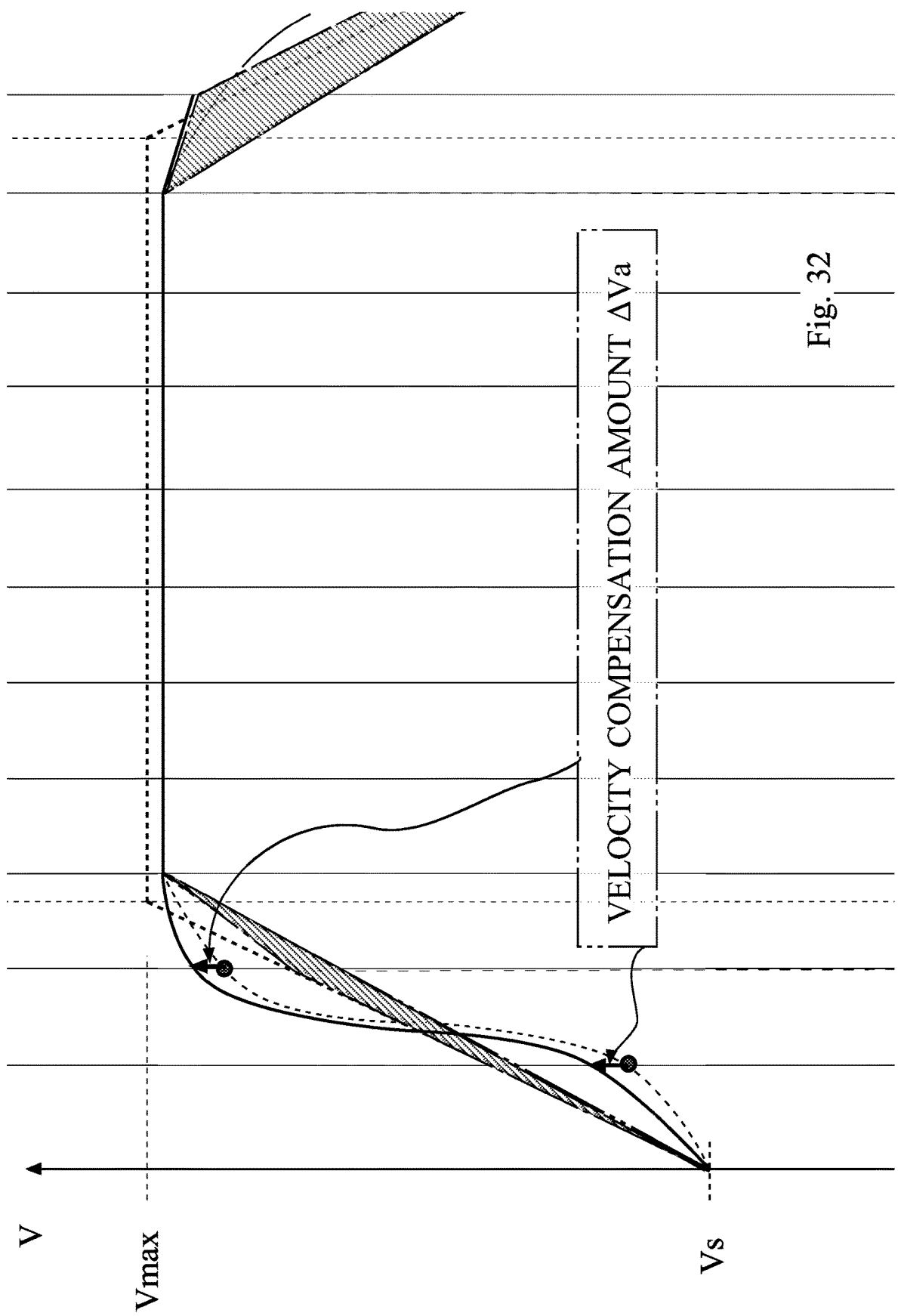

METHOD FOR CONTROLLING SHAPE MEASURING APPARATUS

INCORPORATION BY REFERENCE

This application is based upon and claims the benefit of priority from Japanese patent application No. 2017-173575, filed on Sep. 8, 2017, the disclosure of which are incorporated herein in its entirety by reference.

BACKGROUND OF THE INVENTION

1. Field of the Invention

The present invention relates to a method for controlling a shape measuring apparatus.

2. Description of Related Art

There is known a shape measuring apparatus that measures the shape of an object to be measured by moving a probe along a surface of the object to be measured while scanning the surface (for example, JP 2008-241420 A, JP 2013-238573 A, JP 2014-21004 A).

To perform scanning measurement, a path for the scanning measurement needs to be prepared.

The apparatus disclosed in JP 2008-241420 A converts design data based on CAD data (for example, non-uniform rational B-spline (NURBS) data) into a group of polynomials curves in a predetermined degree.

This procedure is briefly described.

First, CAD data (for example, NURBS data) including path information is received from an external CAD system or the like and converted into data of a group of points.

The data of each point is a combination of coordinates (x, y, z) and normal line directions (P, Q, (that is, (x, y, z, P, Q, R)).

Hereinafter, the data of the group of points including the information (x, y, z, P, Q, R) is referred to as "contour point data" for the sake of the explanation below.

Next, the coordinates of each point are offset in the normal line direction by a predetermined amount.

(The predetermined amount is, specifically, a stylus tip radius r–a reference amount of deflection E0.)

The data of the group of points obtained in this manner is referred to as "offset contour point data".

Then, the offset contour point data is converted into a group of polynomial curves in a predetermined degree.

Here, it is assumed that the polynomial is a cubic function, and the curves are parametric cubic curves (PCC).

A path for scanning measurement is generated based on a PCC curve. Furthermore, the PCC curve is divided into a group of divided PCC curves.

By calculating a velocity curve from the group of divided PCC curves, a moving speed (movement vector) of a probe is calculated.

For example, the moving speed (movement vector) of the probe is set based on the curvature or the like of each segment of the group of divided PCC curves.

By moving the probe based on the moving speed calculated in this manner, the probe is moved along the surface of the object to be measured (passive nominal scanning measurement: note that, the word "nominal" in this description means scanning along a predetermined trajectory calculated in advance based on design data of an object).

There is also known a method for performing scanning measurement while correcting a trajectory by continuously calculating a deflection correcting vector so as to keep an amount of deflection of a probe constant (active nominal scanning measurement).

The active nominal scanning measurement disclosed in JP 2013-238573 A is briefly described.

In the active nominal scanning measurement, a resultant vector V expressed by the following Expression 1 is a movement command for a probe.

The probe is moved based on the resultant vector V, and thereby scanning measurement to a workpiece surface in which the probe (stylus tip) is moved along a PCC curve and the amount of deflection is constant, that is, active nominal scanning measurement is implemented.

$$V = Gf \times Vf + Ge \times Ve + Gc \times Vc \qquad \text{(Expression 1)}$$

With reference to FIG. 1, Expression 1 is briefly described.

In FIG. 1, there is a PCC curve (that is, a scanning path) at the position offset from the design data (contour point data) by a predetermined amount (a stylus tip radius r–a reference amount of deflection E0).

Furthermore, the actual workpiece is slightly shifted from the design data in FIG. 1.

The vector Vf is a path velocity vector.

The path velocity vector Vf has a direction from an interpolation point (i) on the PCC curve to the next interpolation point (i+1).

Note that, the magnitude of the path velocity vector Vf is determined based on, for example, the curvature of the PCC curve at the interpolation point (i) (for example, JP 2014-21004 A).

The vector Ve is a deflection correcting vector for keeping the amount of deflection Ep of the probe to a predetermined reference amount of deflection E0 (for example, 0.3 mm).

(The Deflection Correcting Vector Ve is Necessarily Parallel to the Normal Line of the Workpiece Surface.)

The vector Vc is a trajectory correcting vector.

The trajectory correcting vector Vc is parallel to a perpendicular from the probe position to the PCC curve.

In Expression 1, Gf, Ge, and Gc are a scanning driving gain, a deflection direction correcting gain, and a trajectory correcting gain respectively.

A PCC curve is exemplified in FIG. 2.

FIG. 2 shows a PCC curve L_PCC from a point P1 to a point P7, the PCC curve L_PCC is divided into a plurality of segments by points P.

(Each Segment is Also a PCC Curve.)

The end point of each segment is the start point of the next segment (PCC curve).

It is assumed that the coordinates of the start point of each segment is represented as $(K_{X0}, K_{Y0}, K_{Z0})$, and that the length of the straight line between the start point and the end point of each PCC curve is D.

With this definition, the coordinates $\{X(S), Y(S), Z(S)\}$ of an arbitrary position on the PCC curve is expressed by the following expressions using coefficients ($K_{X3}, K_{X2}, K_{Z1},$ and $K_{Z0}$) representing a cubic curve.

$$X(S) = K_{X3}S^3 + K_{X2}S^2 + K_{X1}S + K_{X0}$$

$$Y(S) = K_{Y3}S^3 + K_{Y2}S^2 + K_{Y1}S + K_{Y0}$$

$$Z(S) = K_{Z3}S^3 + K_{Z2}S^2 + K_{Z1}S + K_{Z0}$$

If a workpiece has a simple shape such as a plane or a circle having a constant curvature, the path for scanning measurement is also a simple shape such as a straight line or a circle, and a PCC curve does not need to be divided into a plurality of segments.

However, if a measurement portion of a workpiece has a complicated shape, in order to highly accurately perform scanning measurement while a probe accurately follows the measurement portion, a PCC curve needs to be finely divided to increase the number of segments.

For example, in order to perform scanning measurement to a contour shape having a curve as shown FIG. 3, the curve is divided into segments at points where the curvature is changed as exemplified in FIG. 4.

Then, an appropriate velocity pattern is set for each segment (JP 2014-21004 A).

In other words, a velocity pattern for the probe to accurately follow the curve and move at the highest possible speed is set according to each segment.

FIG. 5 shows an example of the velocity pattern.

SUMMARY OF THE INVENTION

For example, acceleration/deceleration of the moving speed is to be controlled according to the velocity pattern obtained as shown in FIG. 5, but, in practical, the following problem has been occurred.

The velocity pattern in FIG. 5 is obtained by fitting a velocity pattern to the shape, such as a curvature, of a PCC curve and performing arithmetic processing.

However, when the drive of a shape measuring apparatus is actually controlled, a command is executed on a control-sampling-cycle basis.

FIG. 6 is referred to as an example.

FIG. 6 shows a velocity pattern with a graduation per control sampling cycle (T) on the time axis.

FIG. 6 shows an example in which the velocity pattern is coincidentally perfectly synchronized with the control sampling cycle.

At first, a probe accelerates from an initial velocity Vs, reaches a uniform velocity V, moves at a uniform velocity V, and decelerates to a final velocity Ve.

As long as the probe accelerates and decelerates on the times set in the velocity pattern, the probe is to reach the target point.

On the other hand, FIG. 7 shows an example in which a velocity pattern is not synchronized with a control sampling cycle.

Although a probe accelerates from the initial velocity Vs and reaches the uniform velocity V in the velocity pattern, the end time of the acceleration is not synchronized with the end of the control sampling cycle.

Thus, the probe continues accelerating until the end of the control sampling cycle.

Then, the probe exceeds the target uniform velocity V, and the position of the probe passes the calculated target point.

Furthermore, the prove moves at the uniform velocity V, and then starts to decelerate in a deceleration section. However, the start of the deceleration is not synchronized with the start of the control sampling cycle.

Thus, the prove continues to move at the uniform velocity V to the end of the control sampling cycle.

When the deceleration timing is delayed, the final position of the probe has passed the calculated target point.

Each time the acceleration/deceleration changing timing is shifted from the control sampling cycle in this manner, control errors are accumulated.

In the conventional drive control of a shape measuring apparatus, the magnitude of the maximum velocity and the maximum acceleration is not so large, and a control lag does not cause a large fatal error.

(Alternatively, the Maximum Velocity and the Maximum Acceleration are Suppressed so as Not to Cause a Large Control Lag.)

However, since the improvement of the measurement efficiency has been desired recently, the problem of a control lag should be solved to increase the maximum velocity and the maximum acceleration.

A purpose of the present invention is to provide a method for controlling a shape measuring apparatus that synchronizes an acceleration/deceleration changing timing in a velocity pattern with a control sampling cycle, and prevents a control lag.

A method for controlling a shape measuring apparatus in an embodiment of the present invention is a method for controlling a shape measuring apparatus that moves a probe along a surface of an object to be measured to measure a shape of the object to be measured, the method including:

generating, based on a shape of a movement path set based on preliminarily-obtained shape data of the object to be measured, a velocity pattern for the probe to move along the movement path;

determining whether a velocity changing timing of the velocity pattern is synchronized with a control sampling cycle of the shape measuring apparatus; and correcting, when the velocity changing timing of the velocity pattern is not synchronized with the control sampling cycle, the velocity pattern such that the velocity changing timing of the velocity pattern is synchronized with the control sampling cycle of the shape measuring apparatus.

In an embodiment of the present invention, it is preferable that the correcting the velocity pattern to be synchronized with the control sampling cycle including:

when an initial velocity and a final velocity of the velocity pattern are zero, and when the velocity pattern is a trapezoid pattern, calculating a value Nm by adding the number of times of control sampling in an acceleration section Na to the number of times of control sampling in a uniform velocity section Nf and rounding up the sum after the decimal points;

calculating a correction maximum velocity Vm, which is a velocity in the uniform velocity section, with $S/(T \times Nm)$ where S is a total moving distance, and T is one control sampling cycle;

calculating a value Nam, which is a rounded value of the number of times of control sampling in the acceleration section Na, with ROUNDUP (Na', 0) where $Na'=Vm/(T \times \alpha)$, and $\alpha$ is acceleration before the correction; and setting the number of times of control sampling in the uniform velocity section Nfm as Nfm=Nm−Nam.

In an embodiment of the present invention, it is preferable that the correcting the velocity pattern to be synchronized with the control sampling cycle including:

when an initial velocity and a final velocity of the velocity pattern are zero, and when the velocity pattern is a triangle pattern, the rounded number of times of control sampling in an acceleration section Nan is calculated with the following expression;

$$Nan=\text{Roundup}(Na, 0)$$

where Na is $S=\alpha \times (Na \times T)^2$, S is a total moving distance, $\alpha$ is acceleration before the correction, and T is one control sampling cycle.

A method for controlling a shape measuring apparatus in an embodiment of the present invention is a method for controlling a shape measuring apparatus that moves a probe along a surface of an object to be measured to measure a shape of the object to be measured, the method including:

generating, based on a shape of a movement path set based on preliminarily-obtained shape data of the object to be measured, a velocity pattern for the probe to move along the movement path;

determining whether a velocity changing timing of the velocity pattern is synchronized with a control sampling cycle of the shape measuring apparatus; and correcting, when the velocity changing timing of the velocity pattern is not synchronized with the control sampling cycle, the velocity pattern such that the velocity changing timing of the velocity pattern is synchronized with the control sampling cycle of the shape measuring apparatus.

In an embodiment of the present invention, it is preferable that the correcting the velocity pattern to be synchronized with the control sampling cycle including:

when the velocity pattern is a trapezoid pattern, setting the number of times of control sampling in an acceleration section before the correction as Na, the number of times of control sampling in a deceleration section before the correction as Nd, the number of times of control sampling in a uniform velocity section before the correction as Nf, and the total number of times of control sampling before the correction as Nt;

calculating the total number of times of control sampling after the correction Ntm by rounding up, after the decimal points, the total number of times of control sampling before the correction Nt;

calculating the number of times of control sampling in the acceleration section after the correction Nam by rounding up the value Na;

calculating the number of times of control sampling in the deceleration section after the correction Ndm by rounding up the value Nd;

calculating the number of times of control sampling in the uniform velocity section after the correction Nft with Ntm−(Nam+Ndm)−2; and inserting an adjustment section for one control sampling cycle between the acceleration section and the uniform velocity section and between the uniform velocity section and the deceleration section.

In an embodiment of the present invention, it is preferable that when respective signs of acceleration in the adjustment section and acceleration before the correction are reversed, "1" is subtracted from the value Nam, and "1" is subtracted from the value Ndm.

In an embodiment of the present invention, it is preferable that the correcting the velocity pattern to be synchronized with the control sampling cycle including:

when the velocity pattern is a triangle pattern, setting the number of times of control sampling in an acceleration section before the correction as Na, the number of times of control sampling in a deceleration section before the correction as Nd, and the total number of times of control sampling before the correction as Nt;

calculating the total number of times of control sampling after the correction Ntm by rounding up, after the decimal points, the total number of times of control sampling before the correction Nt;

calculating the number of times of control sampling in the acceleration section after the correction Nam by subtracting 1 from the value obtained by rounding up the value Na;

calculating the number of times of control sampling in the deceleration section after the correction Ndm by subtracting 1 from the value obtained by rounding up the value Nd;

calculating the number of times of control sampling in the uniform velocity section after the correction Nft with Ntm−(Nam+Ndm)−2; and inserting an adjustment section for one control sampling cycle between the acceleration section and the uniform velocity section and between the uniform velocity section and the deceleration section.

A method for controlling a shape measuring apparatus in an embodiment of the present invention is a method for controlling a shape measuring apparatus that moves a probe along a surface of an object to be measured to measure a shape of the object to be measured, the method including:

generating, based on a shape of a movement path set based on preliminarily-obtained shape data of the object to be measured, a velocity pattern for the probe to move along the movement path;

determining whether a velocity changing timing of the velocity pattern is synchronized with a control sampling cycle of the shape measuring apparatus;

correcting, when the velocity changing timing of the velocity pattern is not synchronized with the control sampling cycle, the velocity pattern such that the velocity changing timing of the velocity pattern is synchronized with the control sampling cycle of the shape measuring apparatus;

calculating temporary S-shaped velocity curves of an acceleration section and a deceleration section in the velocity pattern after the correction assuming that the probe monotonously accelerates from an initial velocity Vs in the acceleration section, reaches a correction maximum velocity Vm, monotonously decelerates from the correction maximum velocity Vm in the deceleration section, and reaches a final velocity Ve;

calculating an insufficient distance Da in the movement according to each temporary S-shaped velocity curve;

calculating a velocity compensation amount ΔV to compensate the insufficient distance Da with the number of times of control sampling in the acceleration section or the deceleration section; and setting a value obtained by adding the velocity compensation amount ΔV to the temporary S-shaped velocity curve at each control sampling timing as a velocity after the correction.

BRIEF DESCRIPTION OF THE DRAWINGS

FIG. 32 is a diagram showing an example of a velocity compensation amount.

DETAILED DESCRIPTION

Figure 1:
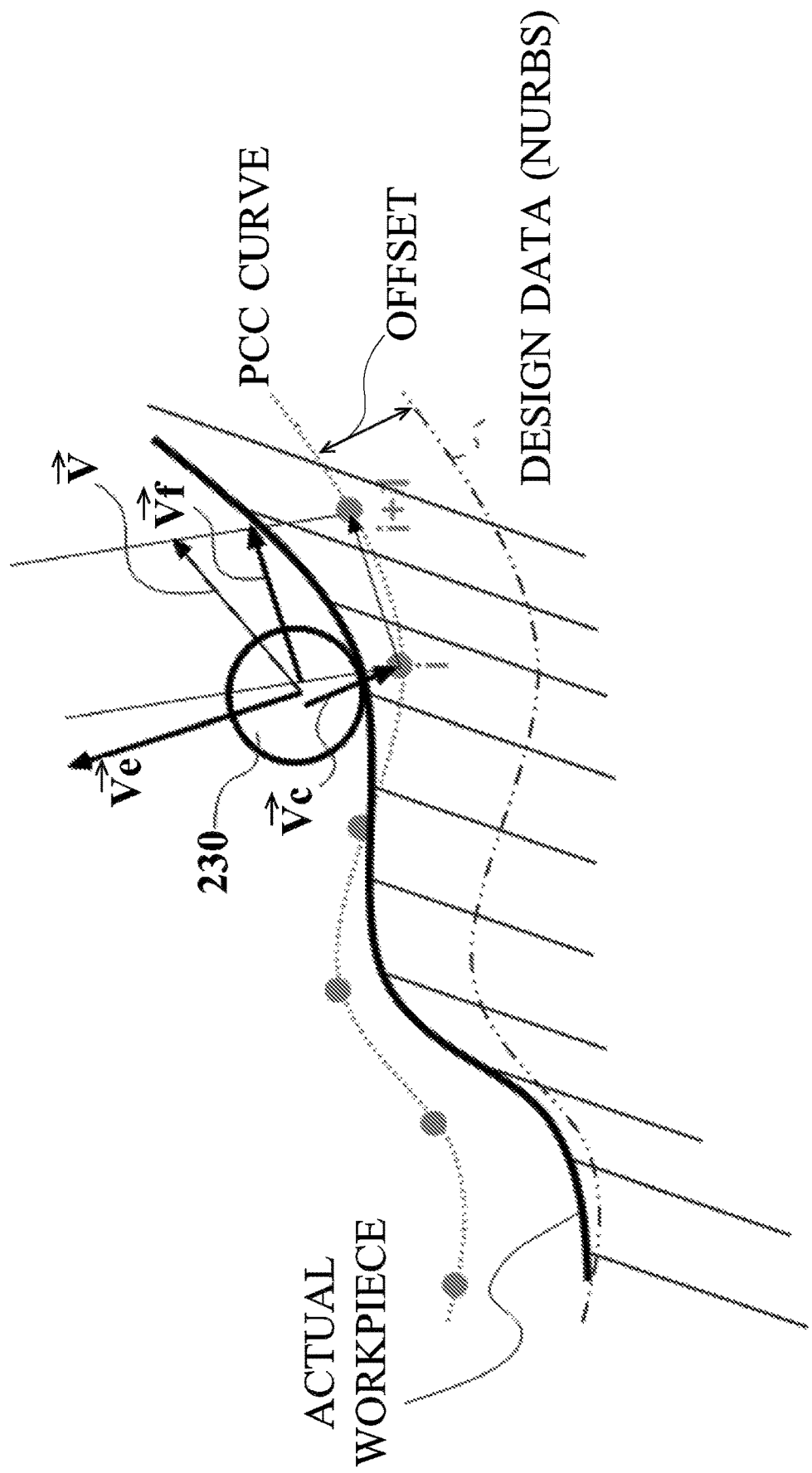
FIG. 1 is a diagram exemplifying the relationship among design data (contour point data), a PCC curve, and an actual workpiece.
Figure 2:
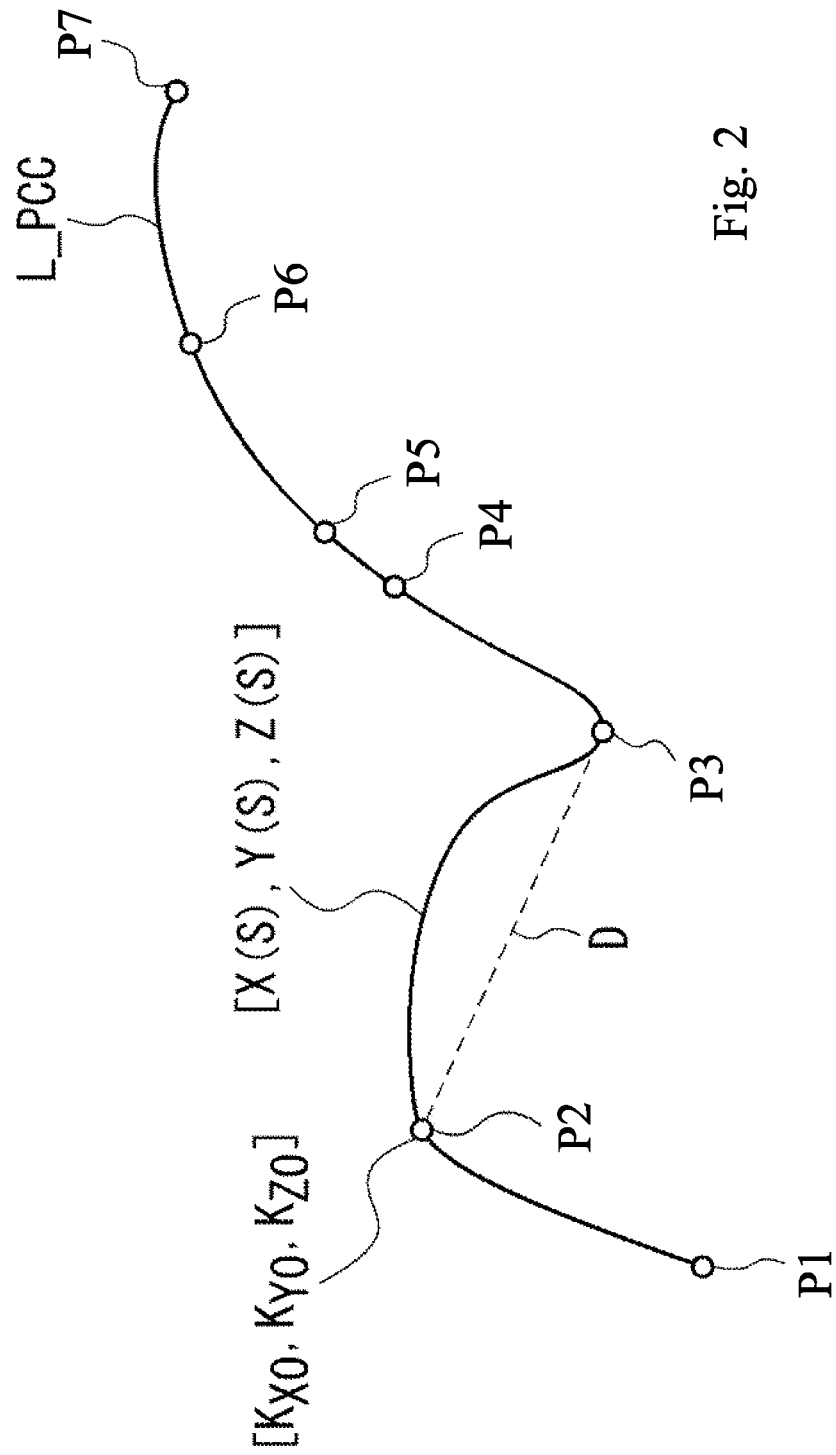
FIG. 2 is a diagram exemplifying a PCC curve.
Figure 3:
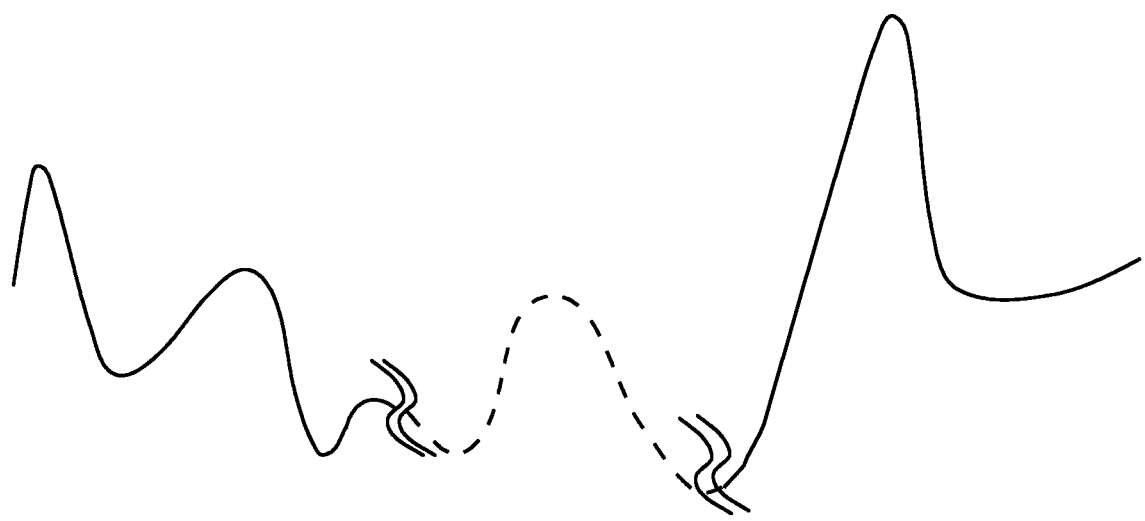
FIG. 3 is a diagram exemplifying a curved contour (PCC curve)
Figure 4:
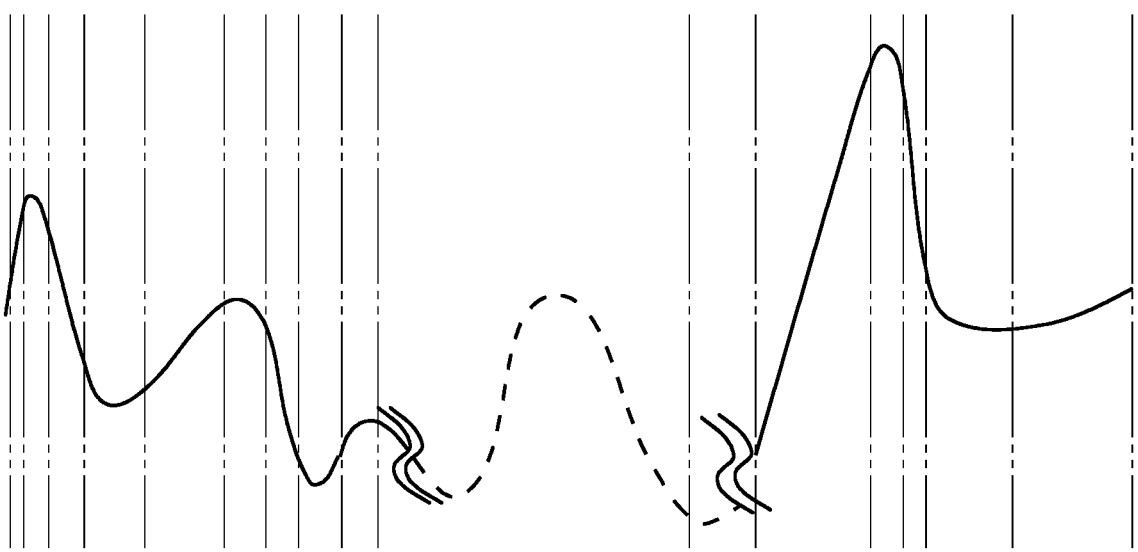
FIG. 4 is a diagram showing an example of a PCC curve divided into segments.

Embodiments of the present invention are illustrated and described with reference to reference signs attached to the elements in the drawings.

First Exemplary Embodiment

Figure 8:
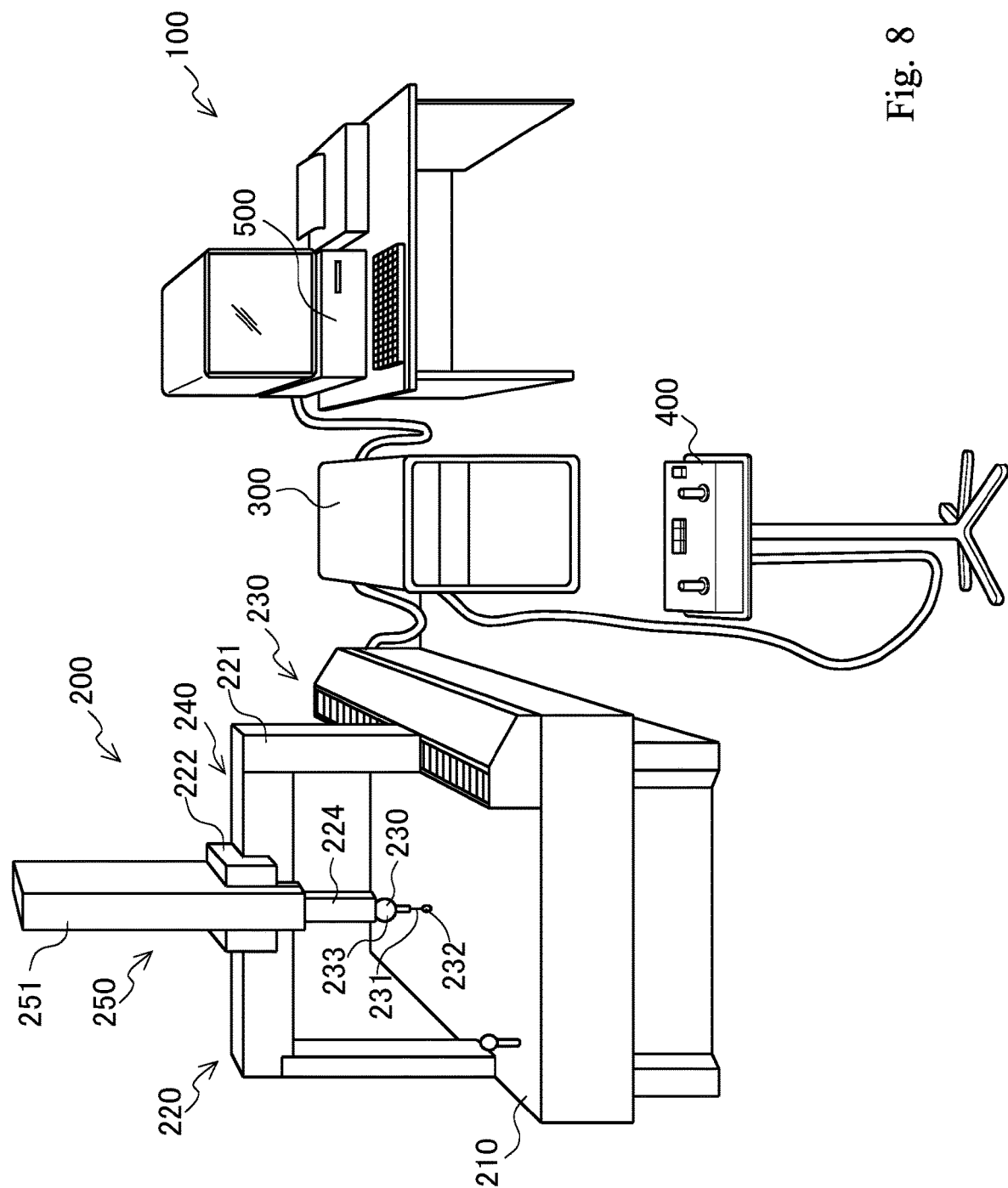
FIG. 8 is a diagram showing a configuration of an entire shape measurement system.

FIG. 8 is a diagram showing a configuration of an entire shape measurement system 100.

The shape measurement system 100 includes a coordinate measuring machine 200, a motion controller 300 that controls the drive of the coordinate measuring machine 200, and a host computer 500 that controls the motion controller 300 and performs necessary data processing.

The coordinate measuring machine 200 itself is well known, but is briefly described.

The coordinate measuring machine 200 includes a base 210, a moving mechanism 220, and a probe 230.

A driving motor (not illustrated) and an encoder (not illustrated) are fixed on each of the Y slider 221, the X slider 222, and the Z spindle 224.

The drive of the driving motors is controlled by drive control signals from the motion controller 300.

The encoders detect the respective motion amounts of the Y slider 221, the X slider 222, and the Z spindle 224, and outputs the detection values to the motion controller 300.

The probe 230 is attached to the lower end of the Z spindle 224.

The probe 230 includes a stylus 231 and a supporting part 233. The stylus 231 has a stylus tip 232 at the tip side (−Z axis direction side). The supporting part 233 supports the base end side (+Z axis direction side) of the stylus 231.

The stylus tip 232 has a spherical shape and is brought into contact with an object to be measured W.

When an external force is applied to the stylus 231, that is, when the stylus tip 232 is brought into contact with the object to be measured W, the supporting part 233 supports the stylus 231 so that the stylus 231 is movable in the directions of the X, Y, and Z axes within a certain range.

The supporting part 233 further includes a probe sensor (not illustrated) that detects a position of the stylus 231 in each axis direction. The probe sensor outputs the detection value to the motion controller 300.

(Configuration of Motion Controller 300)

Figure 9:
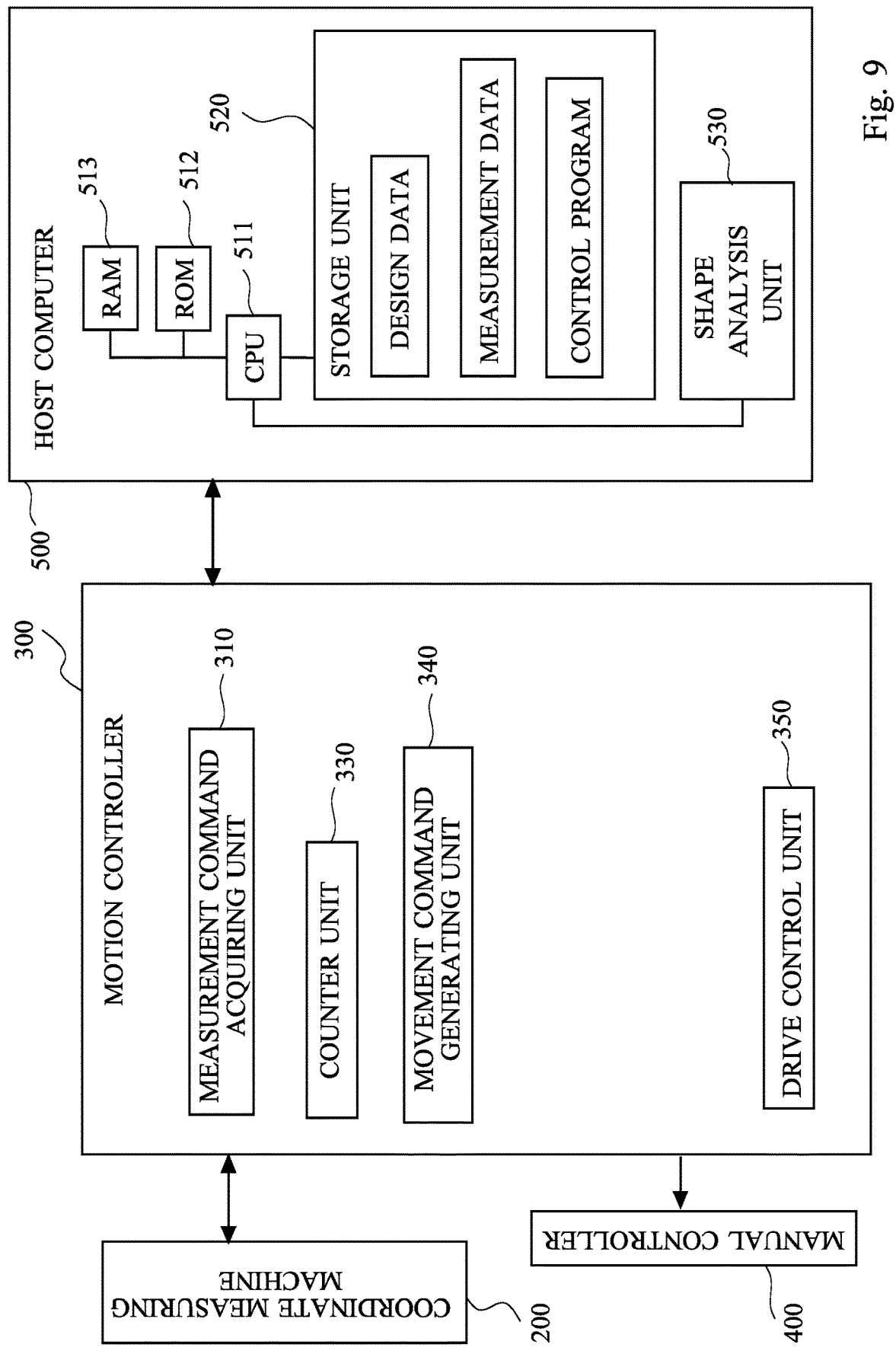
FIG. 9 is a functional block diagram of a motion controller and a host computer.

FIG. 9 is a functional block diagram of the motion controller 300 and the host computer 500.

The motion controller 300 includes a measurement command acquiring unit 310, a counter unit 330, a movement command generating unit 340, and a drive control unit 350.

The measurement command acquiring unit 310 acquires PCC curve data from the host computer 500.

The counter unit 330 measures the displacement amount of each slider by counting detection signals output from the encoder, and measures the displacement amount of the probe 230 (the stylus 231) by counting detection signals output from the probe sensor.

From the measured displacement amounts of each slider and the probe 230, a coordinate position PP (hereinafter, referred to as a probe position PP) of the stylus tip 232 is obtained.

In addition, from the displacement amount of the stylus 231 (the detection value of the probe sensor (Px, Py, Pz)) measured by the counter 330, the amount of deflection (an absolute value of a vector Ep) of the stylus tip 232 is obtained.

The movement command generating unit 340 calculates a movement path for the probe 230 (the stylus tip 232) to measure the surface of the object to be measured W with the probe 230 (the stylus tip 232), and calculates a velocity vector along the movement path.

Figure 10:
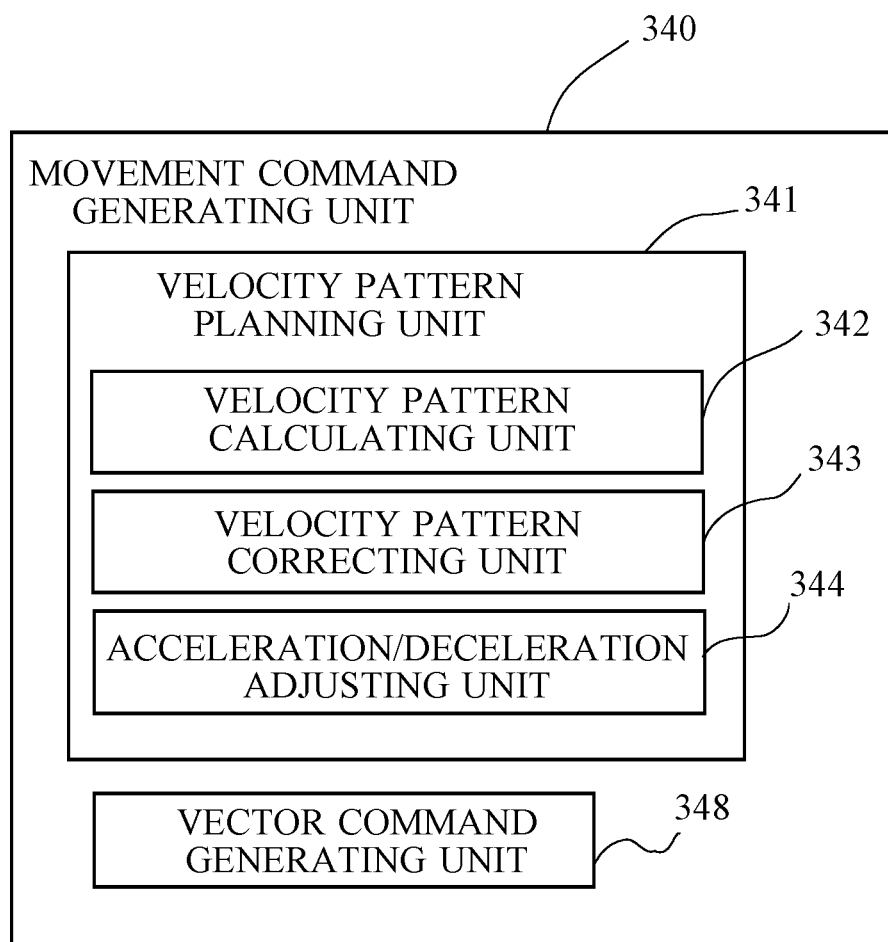
FIG. 10 is a diagram showing a configuration of a movement command generating unit.

The configuration of the movement command generating unit 340 is shown in FIG. 10.

The movement command generating unit 340 includes a velocity pattern planning unit 341, and a vector command generating unit 348.

The velocity pattern planning unit 341 includes a velocity pattern calculating unit 342, a velocity pattern correcting unit 343, and an acceleration/deceleration adjusting unit 344.

The motion of each functional unit is to be described later with reference to a flowchart.

The drive control unit 350 controls the drive of each slider based on the movement vector calculated by the movement command generating unit 340.

Note that, a manual controller 400 is connected to the motion controller 300.

The manual controller 400 includes a joystick and various buttons, receives a manual input operation from a user, and transmits the user's operation instruction to the motion controller 300.

In this case, the motion controller 300 (the drive control unit 350) controls the drive of each slider in response to the user's operation instruction.

(Configuration of the Host Computer 500)

The host computer 500 includes a central processing unit (CPU) 511 and a memory, and controls the coordinate measuring machine 200 through the motion controller 300.

The host computer 500 further includes a storage unit 520 and a shape analysis unit 530.

The storage unit 520 stores design data, such as CAD data or NURBS data, related to the shape of the object to be measured (workpiece) W, measurement data obtained by measurement, and a measurement control program for controlling an overall measurement operation.

The shape analysis unit 530 calculates surface shape data of the object to be measured W based on the measurement data output from the motion controller 300, and performs shape analysis to calculate an error or distortion of the calculated surface shape data of the object to be measured W.

The shape analysis unit 530 further performs arithmetic processing, such as conversion of the design data (CAD data, NURBS data, or the like) into a PCC curve.

The CPU 511 executes the measurement control program, and thereby the measurement operation of the present exemplary embodiment is implemented.

The host computer 500 is connected to output devices (a display and a printer) and input devices (a keyboard and a mouse) as needed.

(Control Method)

With reference to a flowchart, a method for controlling a shape measuring apparatus according to the present exemplary embodiment is described.

As described above, a purpose of the present invention is to synchronize an acceleration/deceleration changing timing of a velocity pattern with a "control sampling cycle" to prevent a control lag.

Figure 7:
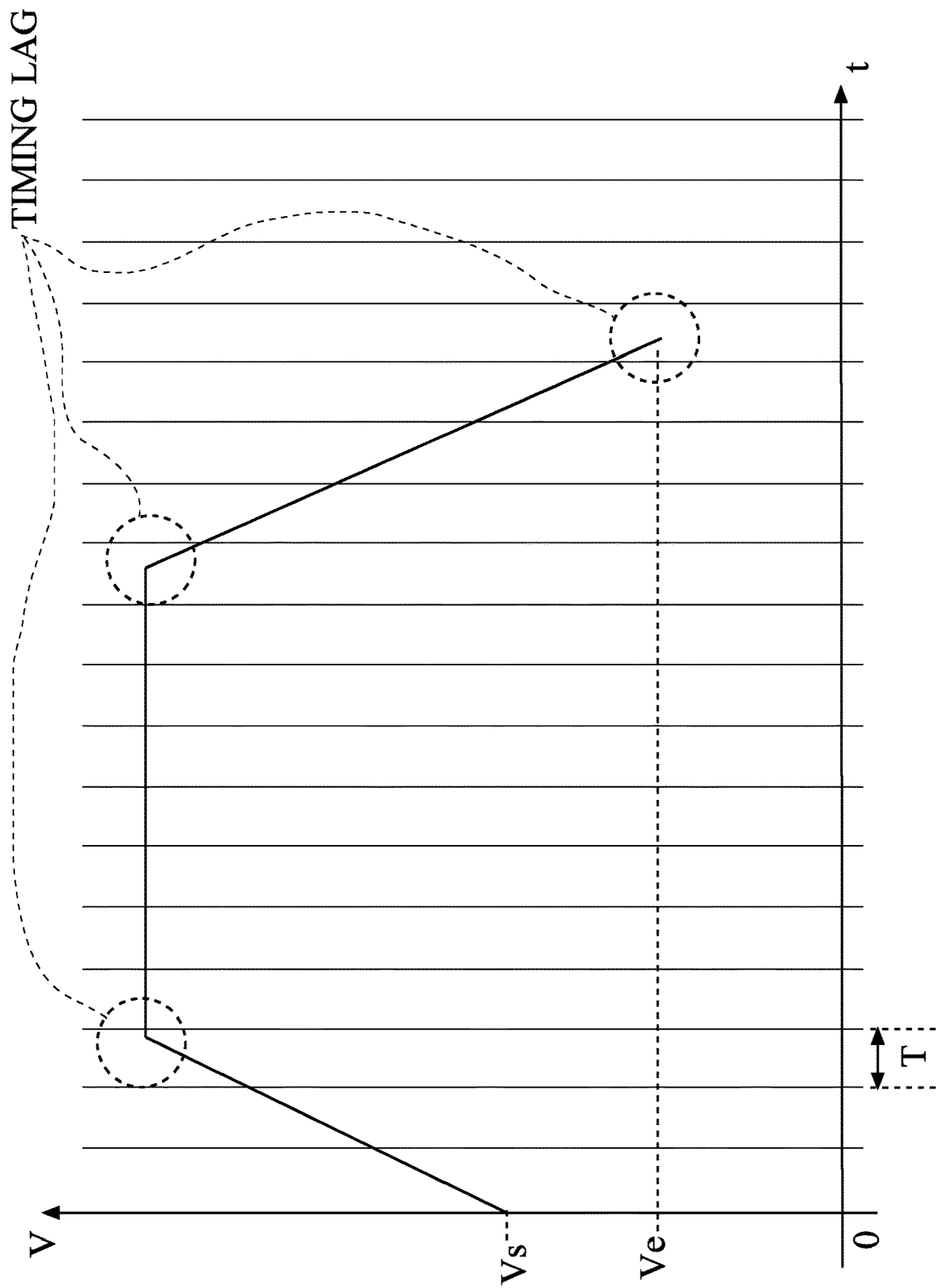
FIG. 7 is a diagram showing a velocity pattern with a graduation per control sampling cycle (T) on the time axis, and showing an example in which the velocity pattern is not synchronized with the control sampling cycle.

A velocity pattern in which an acceleration/deceleration changing timing is not synchronized with a control sampling cycle (for example, in FIG. 7) is corrected to synchronize the acceleration/deceleration changing timing with the control sampling cycle.

Figure 11:
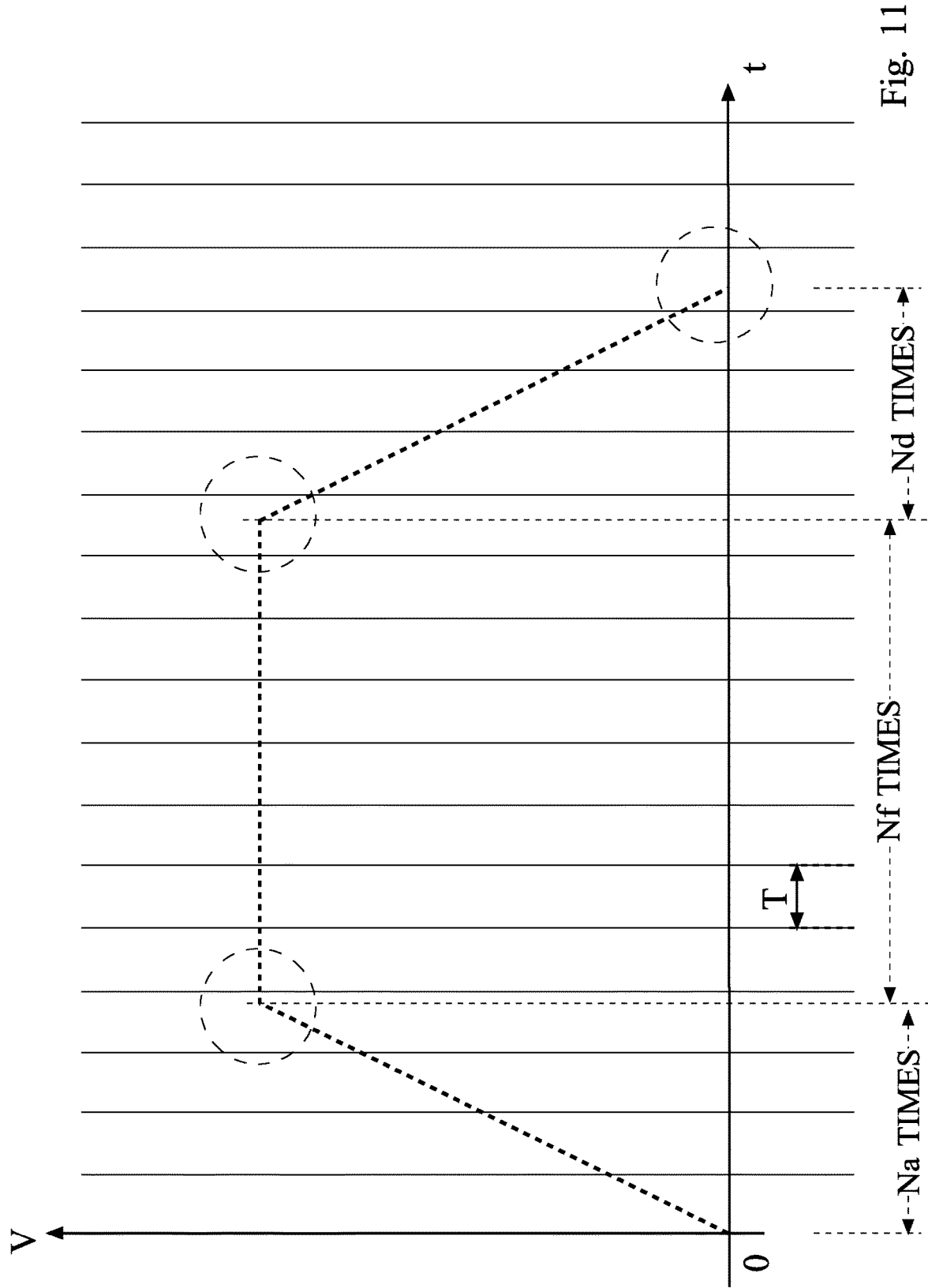
FIG. 11 is a diagram showing an example of a trapezoid pattern in which an initial velocity Vs and a final velocity Ve are zero.
Figure 12:
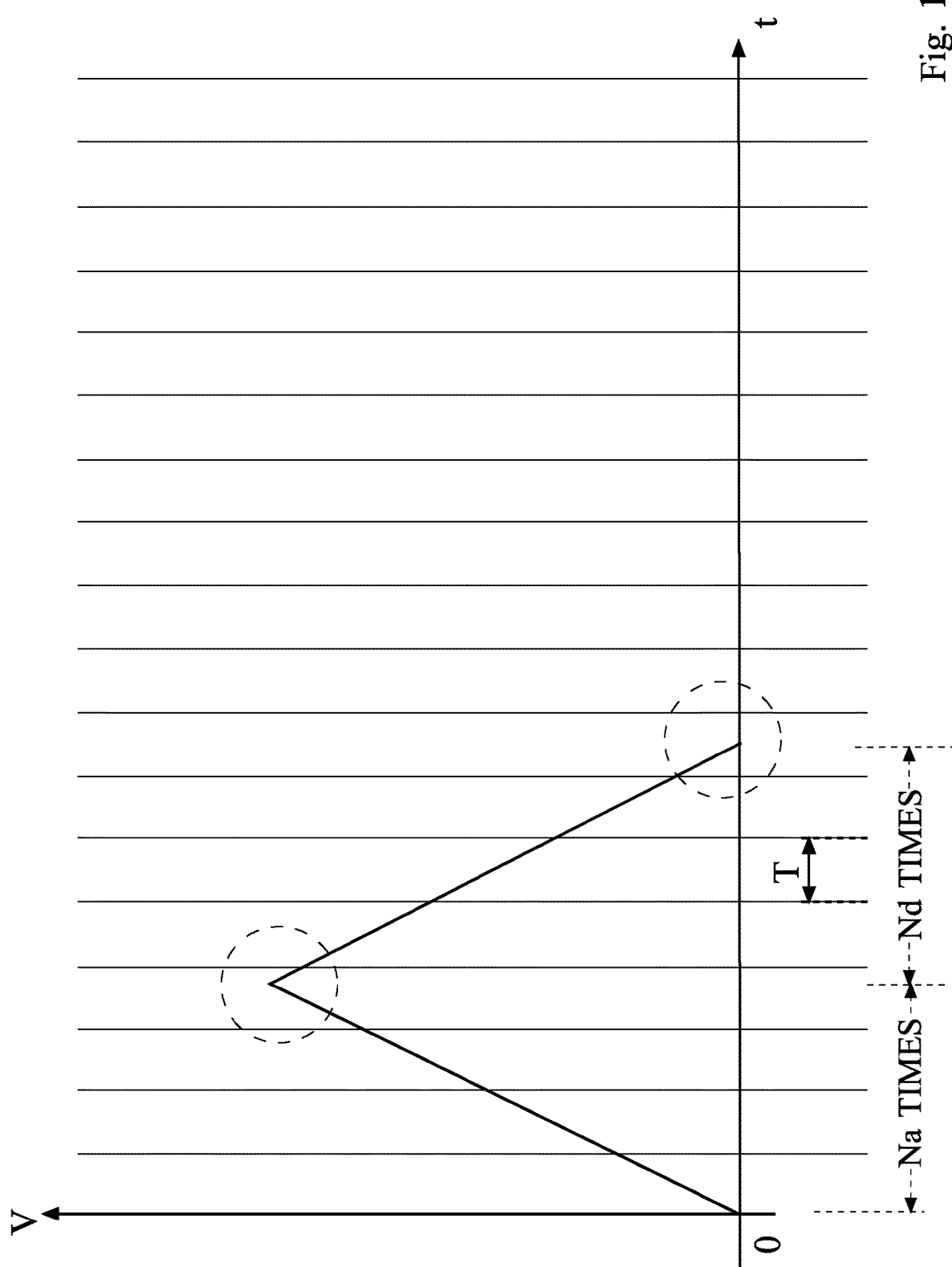
FIG. 12 is a diagram showing an example of a triangle pattern in which an initial velocity Vs and a final velocity Ve are zero.

In the first exemplary embodiment, a velocity pattern in which both of an initial velocity Vs and a final velocity Ve are zero as shown in FIGS. 11 and 12 is described.

(A Velocity Pattern in which Either of the Initial Velocity Vs and the Final Velocity Ve is Not Zero is to be Described in a Second Exemplary Embodiment.)

Figure 13:
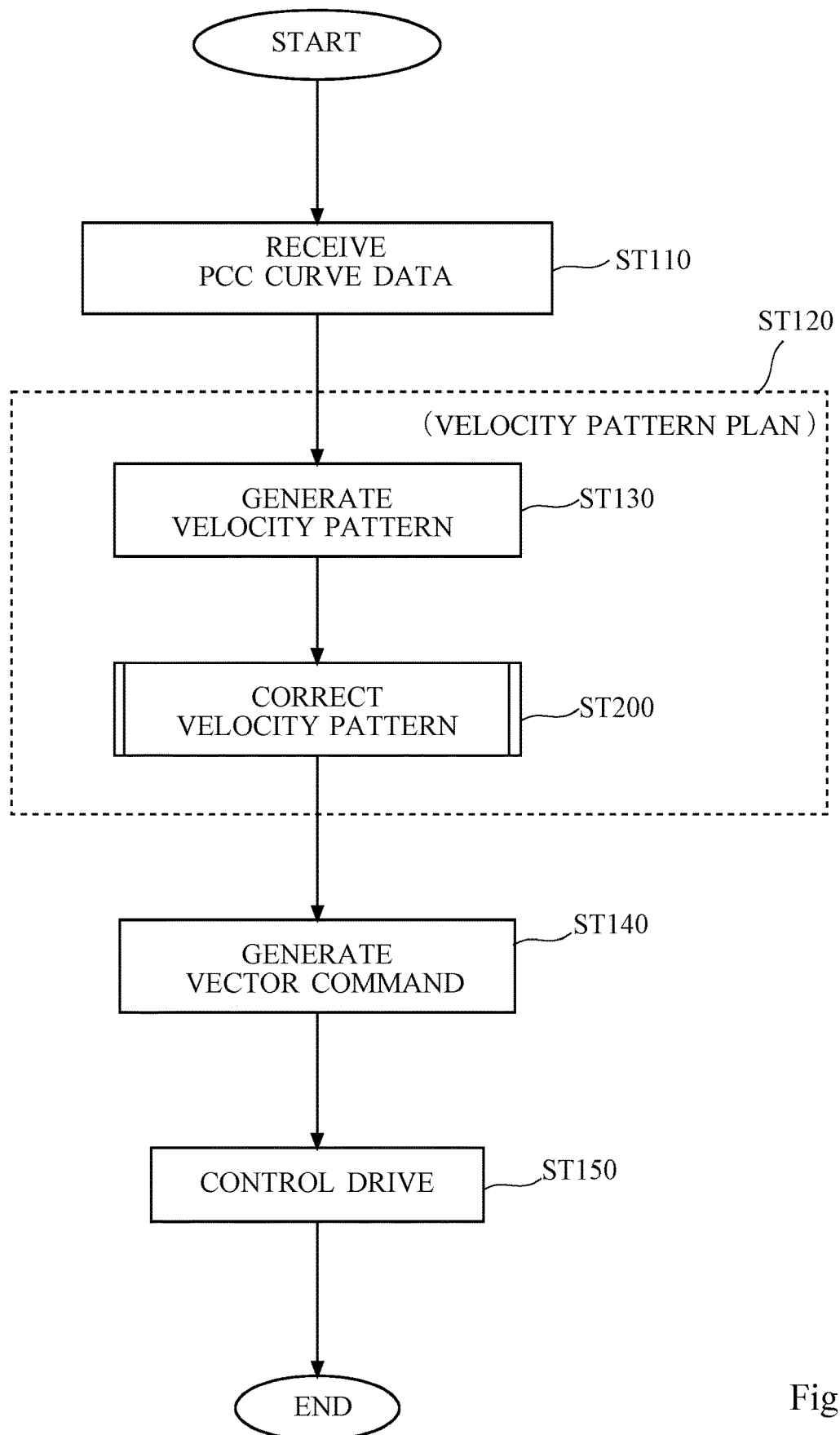
FIG. 13 is an entire flowchart of control motion of the motion controller.

FIG. 13 is an entire flowchart of the control motion of the motion controller 300.

The motion controller 300 receives PCC curve data generated by the host computer 500 as a measurement command (ST110).

The velocity pattern planning unit 341 generates a velocity pattern for the probe 230 to perform scanning movement according to the PCC curve data (ST120).

The velocity pattern calculating unit 342 generates, for each segment, the velocity pattern for the probe 230 to accurately follow the PCC curve and move at the highest possible speed (ST130).

Figure 5:
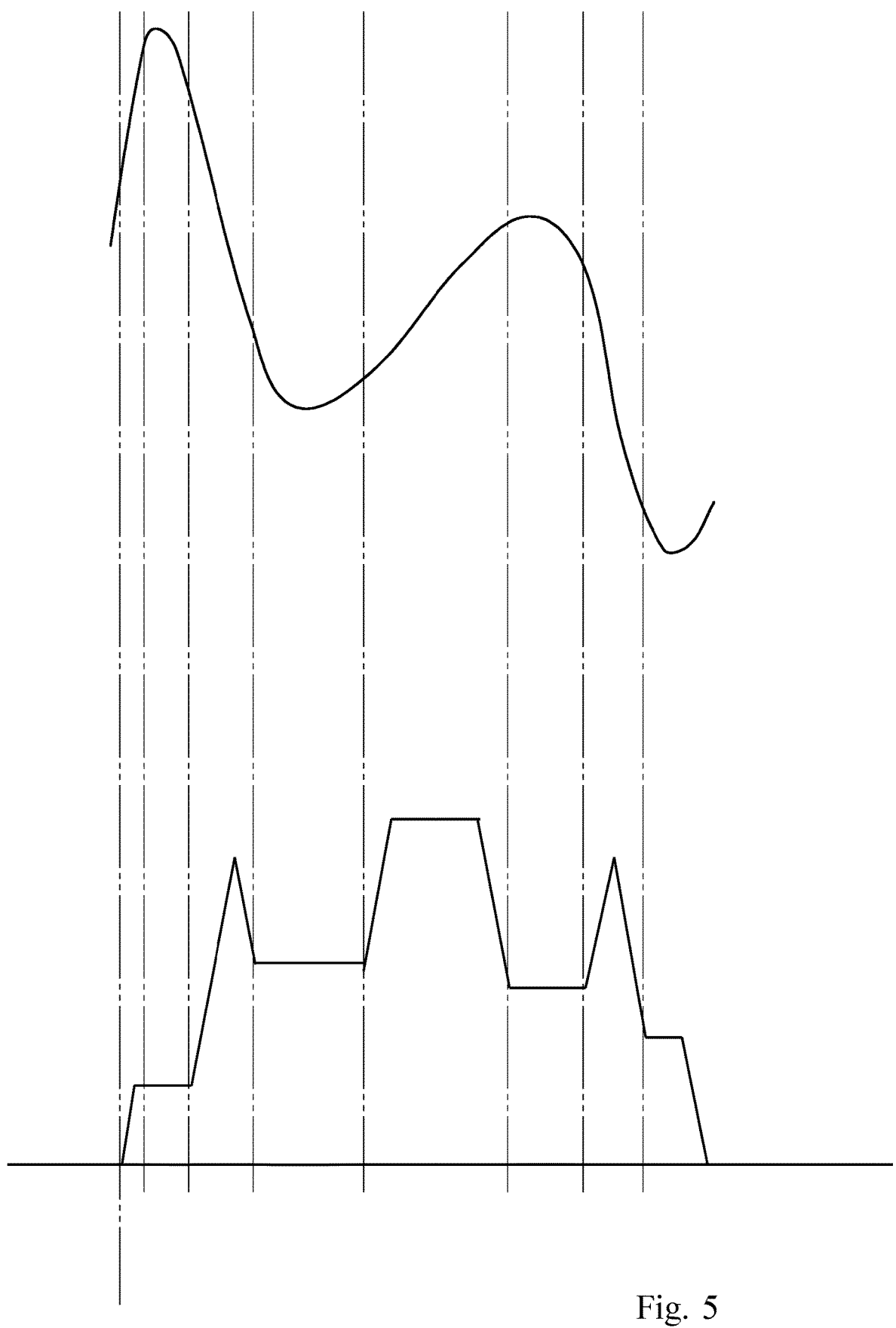
FIG. 5 is a diagram showing an example of a velocity pattern.
Figure 6:
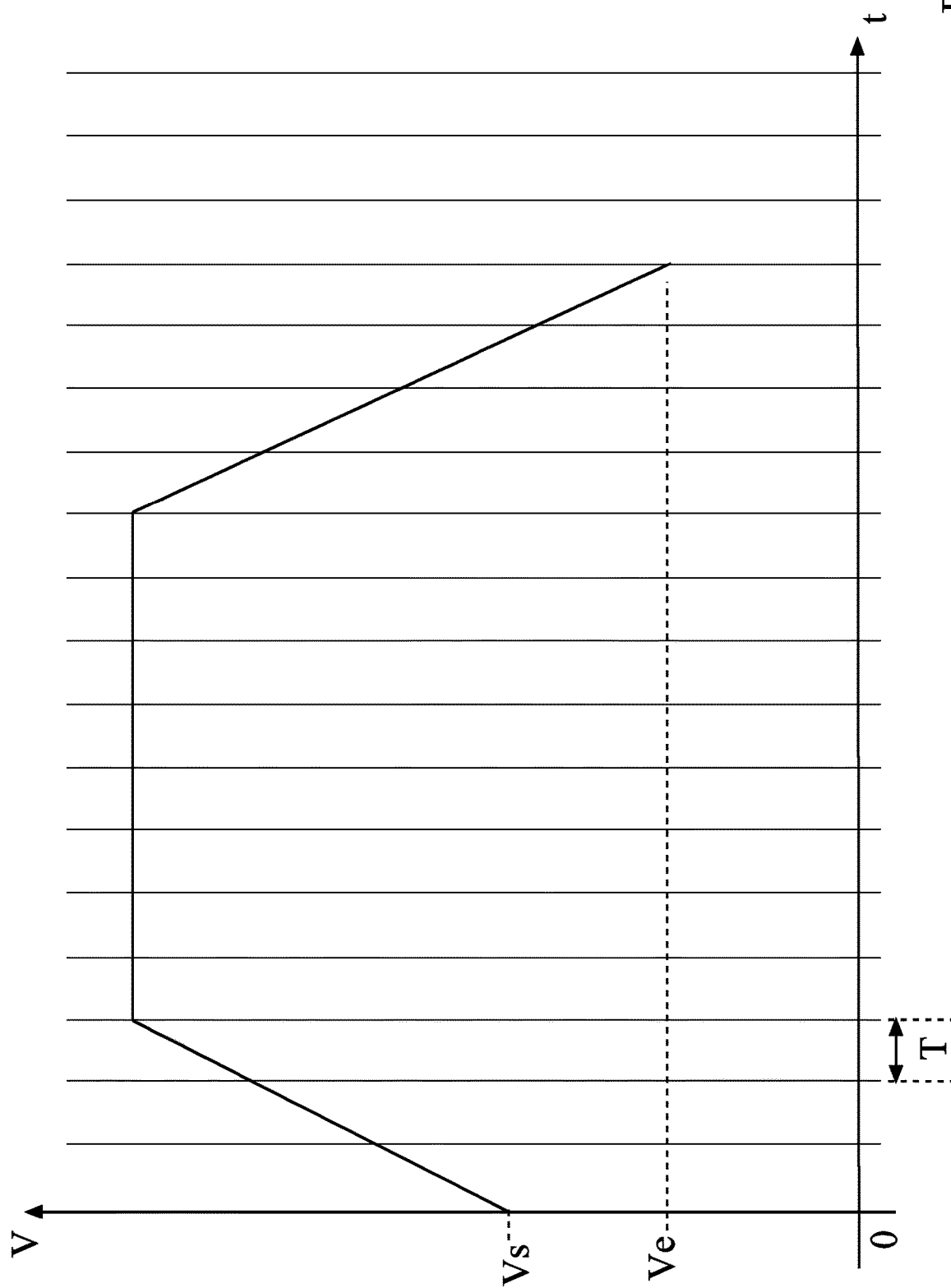
FIG. 6 is a diagram showing a velocity pattern with a graduation per control sampling cycle (T) on the time axis, and showing an example in which the velocity pattern is perfectly synchronized with the control sampling cycle.

This processing is the same as that of a conventional technique, and a velocity pattern in FIG. 5 as described in Description of Related Art, for example, is generated. In the first exemplary embodiment, it is assumed that a velocity pattern in which both the initial velocity Vs and the final velocity Ve are zero as shown in FIG. 11 or 12 is generated.

For example, the velocity pattern is assumed to be a (segment of) PCC curve having a simple figure (for example, a straight line or a curve having constant curvature).

In the velocity pattern in FIG. 11, the probe 230 starts from the state in which the initial velocity Vs is zero, accelerates at uniform acceleration, reaches the maximum velocity Vmax, moves at the uniform velocity of the maximum velocity Vmax for a certain time, decelerates at uniform deceleration, and stops at the final velocity Ve=0.

At this time, it is assumed that the magnitude of the acceleration is equal to that of the deceleration.

This means that the acceleration time is equal to the deceleration time.

As shown in the example in FIG. 11, a velocity pattern having a section for the probe 230 to move at the uniform velocity of the maximum velocity Vmax is referred to as a trapezoid pattern.

The magnitude of the acceleration (or the deceleration) in the acceleration section (or in the deceleration section) is set according to the acceleration resistance of a machine (a coordinate measuring machine).

The maximum acceleration (or the maximum deceleration) in the acceleration section (or in the deceleration section) may be the same value as the acceleration resistance of the machine (coordinate measuring machine).

In practical, the acceleration (or the deceleration) in the acceleration section (or in the deceleration section) is preferably set to the half value of the acceleration resistance of the machine (coordinate measuring machine) in consideration of the safety and the smooth acceleration/deceleration movement (specifically, S-shaped acceleration/deceleration processing).

In this case, when the magnitude of the acceleration resistance of the machine (coordinate measuring machine) is β, the magnitude a of the acceleration (or the deceleration) in the acceleration section (or in the deceleration section) is α=β/2.

The maximum velocity Vmax in the uniform velocity section is set according to the acceleration resistance of the machine (coordinate measuring machine).

The maximum velocity Vmax in the uniform velocity section may be the same value as the acceleration resistance of the machine (coordinate measuring machine) at the maximum, or may be multiplied by a safety factor Q (a value less than 1.0, for example 0.9) in consideration of override.

In the velocity pattern in FIG. 12, the probe 230 starts from a state in which the initial velocity Vs is zero, accelerates at uniform acceleration, starts to decelerate before reaching the maximum velocity Vmax, decelerates at uniform deceleration, and stops at the final velocity Ve=0.

In this case, it is also assumed that the magnitude of the acceleration is equal to that of the deceleration.

This means that the acceleration time is equal to the deceleration time.

As shown in the example in FIG. 12, a velocity pattern having no section for the probe 230 to move at uniform velocity, and shifting to the deceleration section immediately after the acceleration section is referred to as a triangle pattern.

In the velocity pattern in FIG. 11 or 12, the acceleration/deceleration changing timing is not synchronized with a control sampling cycle.

Thus, the velocity pattern correcting unit 343 finely adjusts the velocity pattern (FIG. 11 or 12) to be synchronized with the control sampling cycle (ST200).

In the first exemplary embodiment, the probe 230 is to move at uniform acceleration (uniform deceleration) in the velocity pattern after the correction similarly to the velocity pattern before the correction.

That is, it is assumed that the acceleration (or the deceleration) is constant in the acceleration section (or the deceleration section).

In other words, the acceleration (or the deceleration) is not changed in the acceleration section (or the deceleration section).

Furthermore, it is assumed that the magnitude of the acceleration is equal to that of the deceleration in the velocity pattern after the correction.

This means that the acceleration time is equal to the deceleration time in the velocity pattern after the correction.

(The Concept for Changing the Acceleration and the Deceleration in the Middle of the Respective Sections is to be Described in the Second Exemplary Embodiment.)

Figure 14:
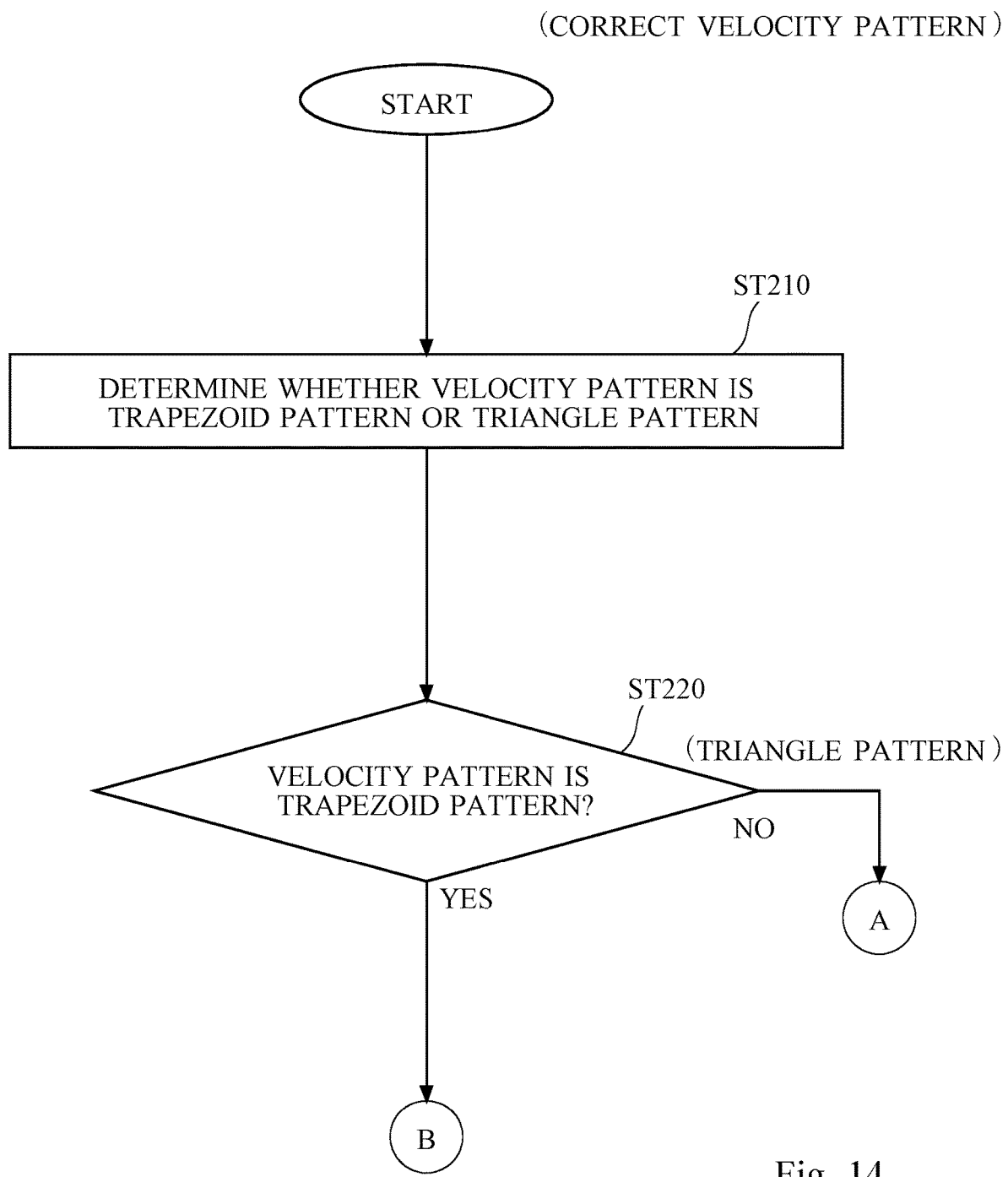
FIG. 14 is a flowchart explaining procedures of velocity pattern correcting processing of a velocity pattern correcting unit.

FIG. 14 is a flowchart explaining procedures of velocity pattern correcting processing of the velocity pattern correcting unit 343.

Since the procedures are slightly different in the case in which the velocity pattern is the trapezoid pattern and the case in which the velocity pattern is the triangle pattern, the velocity pattern correcting unit 343 determines whether the velocity pattern is the trapezoid pattern or the triangle pattern (ST210).

When the maximum distance for the probe 230 to move with the triangle pattern without the trapezoid pattern is represented as St, the maximum distance is expressed as $St=V\text{max}^2/\alpha$.

Thus, it is determined that the velocity pattern is the triangle pattern or the trapezoid pattern depending on whether a moving distance S between the start point and the target position is greater or less than the maximum distance St.

When it is assumed that the movement path is a straight line as a simple case, and that the moving distance from the start point Ps (Xs, Ys, Zs) to the target position Pe (Xe, Ye, Ze) is represented as S, the moving distance S is obtained with the following expression.

$$S^2=(Xe-Xs)^2+(Ye-Ys)^2+(Ze-Zs)^2$$

When S≤St holds, the velocity pattern is the triangle pattern (ST220; NO), and when S>St holds, the velocity pattern is the trapezoid pattern (ST220; YES).

Now, the case in which the velocity pattern is the trapezoid pattern (FIG. 11) is described (ST220; YES).

Figure 15:
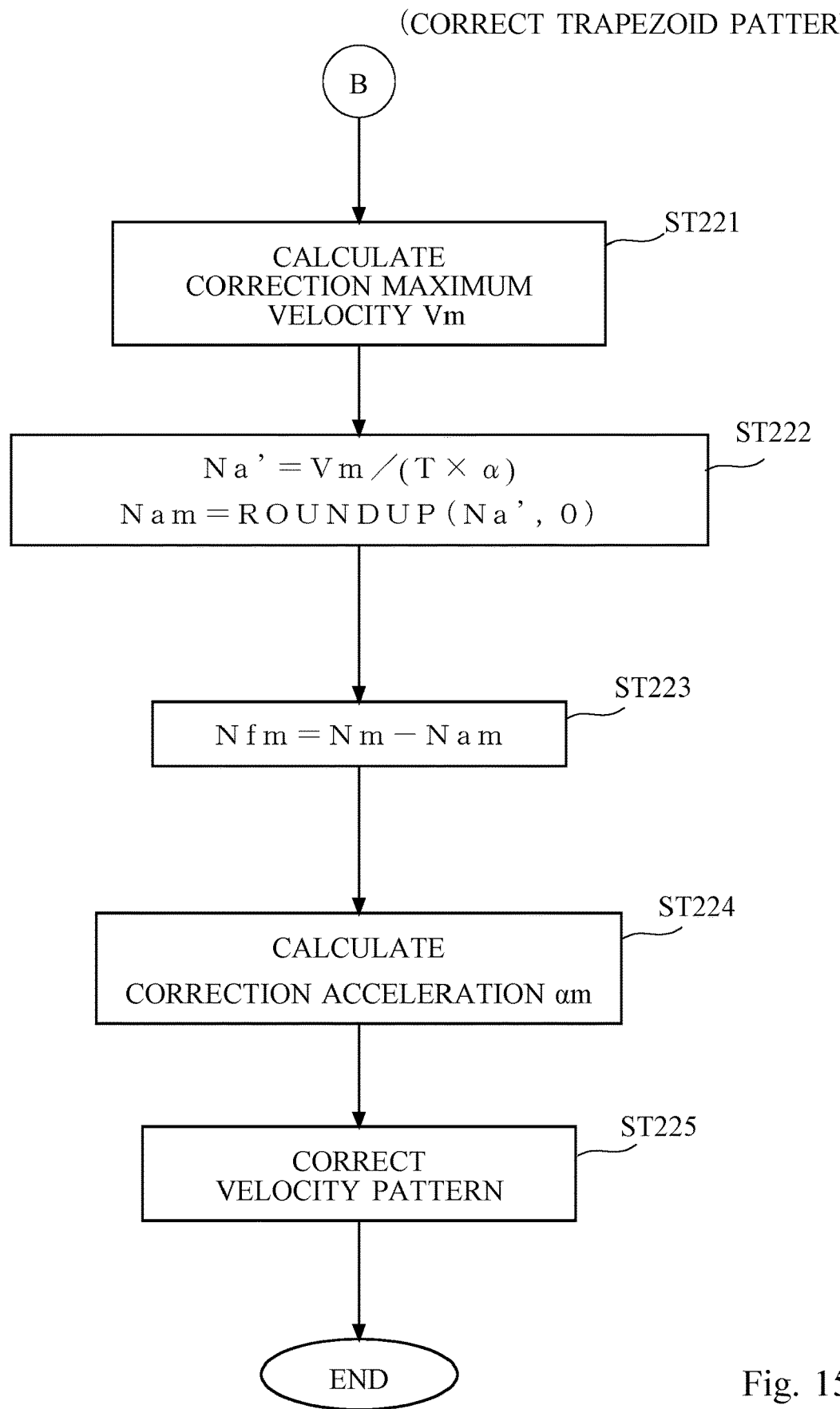
FIG. 15 is a flowchart explaining procedures of the velocity pattern correcting processing.

The procedures in this case are sequentially described with reference to the flowchart in FIG. 15.

It is assumed that the number of times of control sampling in the acceleration section is represented as Na, and that the number of times of control sampling in the uniform velocity section is represented as Nf.

Since the acceleration time is equal to the deceleration time, the number of times of control sampling in the deceleration section Nd is also Na.

The control sampling cycle is represented as T.

Then, the following expression holds.

$$(Na+Nf)=S/(T\times V\text{max}) \quad \text{(Expression 1)}$$

Expression 1 is derived from the following relational expressions;

$$V\text{max}=\alpha\times Na\times T,$$

$$2\times\alpha\times Sa=V\text{max}^2,$$

where Sa is the distance of the acceleration section, $$Sf=Nf\times T\times V\text{max},$$

where, Sf is the distance of the uniform velocity section, and $$S=2\times Sa+Sf.$$

The number of times of control sampling is rounded to be an integer value, and a correction maximum velocity Vm according to the value is calculated (ST221).

Here, "Na+Nf" in Expression 1 is equivalent to a value obtained by adding the number of times of control sampling in the acceleration section to the number of times of control sampling in the uniform velocity section.

Thus, by rounding up the value after the decimal points, an integer value Nm, Nm=ROUNDUP{(Na+Nf), 0}, is obtained.

Then, a velocity Vm corresponding to the integer value Nm is calculated.

Since (Na+Nf) is rounded up after the decimal points to obtain the value Nm, the value Vm is to be less than Vmax.

$$Nm=S/(T\times Vm)$$

$$Vm=S/(T\times Nm) \quad \text{(Expression 1-1)}$$

(The Reason Why Expression 1-1 Holds is to be Easily Understood if the Triangle for the Distance of the Deceleration Section is Moved to the Acceleration Section in, for Example, FIG. 11.)

The velocity Vm calculated in this manner is set as the velocity in the uniform velocity section.

The velocity Vm is set as a correction maximum velocity (ST221).

The velocity in the uniform velocity section is the correction maximum velocity Vm.

Here, the acceleration is assumed to remain α, and the number of times of acceleration Na' for reaching the correction maximum velocity Vm is calculated backward.

Then, $Na'=Vm/(T\times\alpha)$ holds.

The number of times of acceleration Na' is rounded to an integer (ST222).

$$Nam=\text{ROUNDUP}\{Na', 0\}$$

The integer value Nam is the rounded number of times of acceleration.

The same value Nam is used for the number of times of deceleration.

Now that the number of times of acceleration Nam is obtained, the number of times of control sampling in the uniform velocity section is determined according to the value with the following expression.

$$Nfm=Nm-Nam$$

Thus, the number of times of control sampling in the uniform velocity section is obtained as an integer value Nfm (ST223).

Since the number of times of control sampling in the acceleration section is Nam, and the velocity in the uniform velocity section is the correction maximum velocity Vm, acceleration am to be the correction maximum velocity Vm with the number of times of acceleration Nam is calculated (ST224).

$$\alpha m=Vm/(T\times Nam)$$

The acceleration αm calculated in this manner is correction acceleration.

Figure 16:
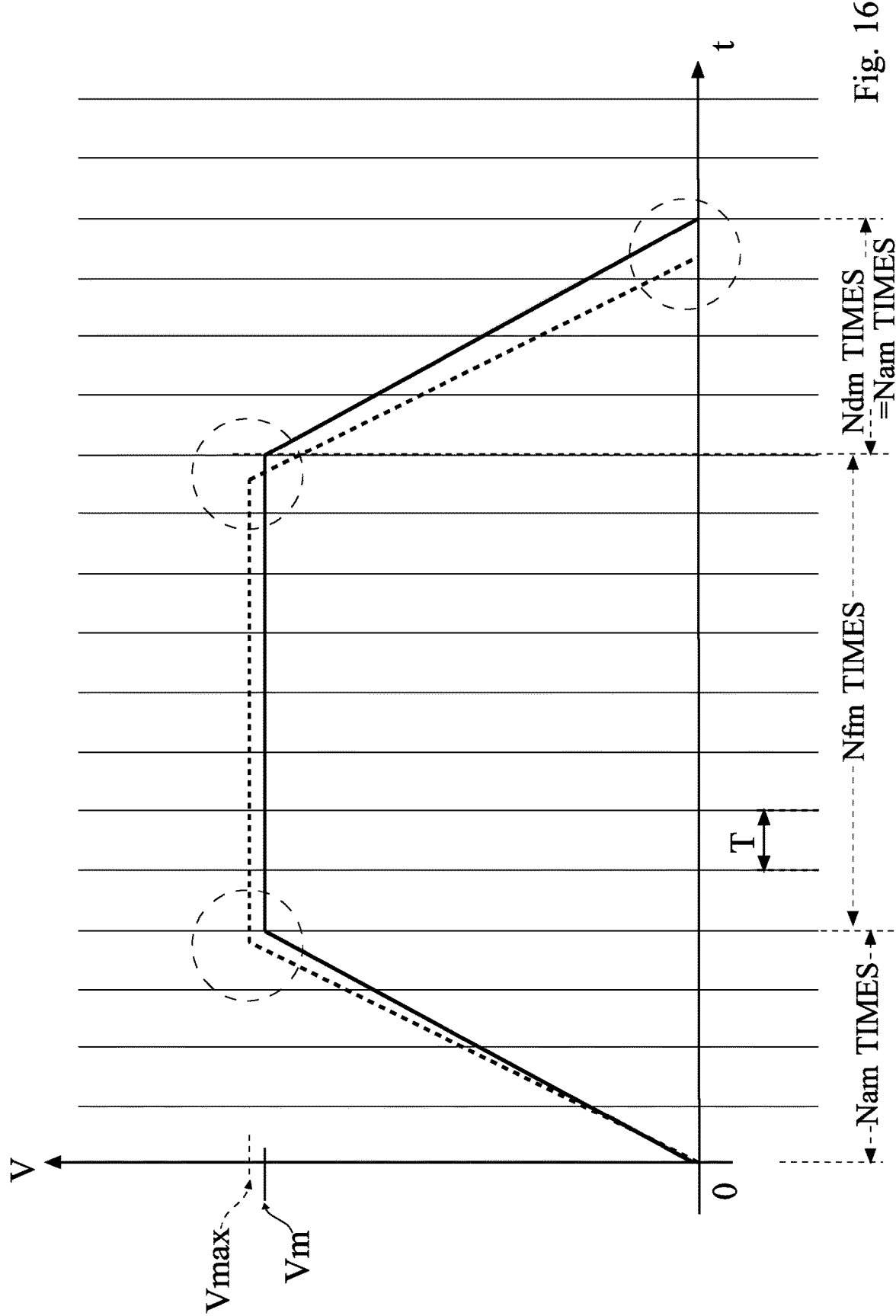
FIG. 16 is a diagram showing a corrected velocity pattern.

When the velocity pattern is corrected using the correction acceleration αm and the correction maximum velocity Vm (FIG. 11), a correction velocity pattern in FIG. 16 is obtained.

(Correcting Processing when Velocity Pattern is Triangle Pattern)

Now, returning to the flowchart in FIG. 14, the case in which the velocity pattern is the triangle pattern is described (ST220: NO).

Figure 17:
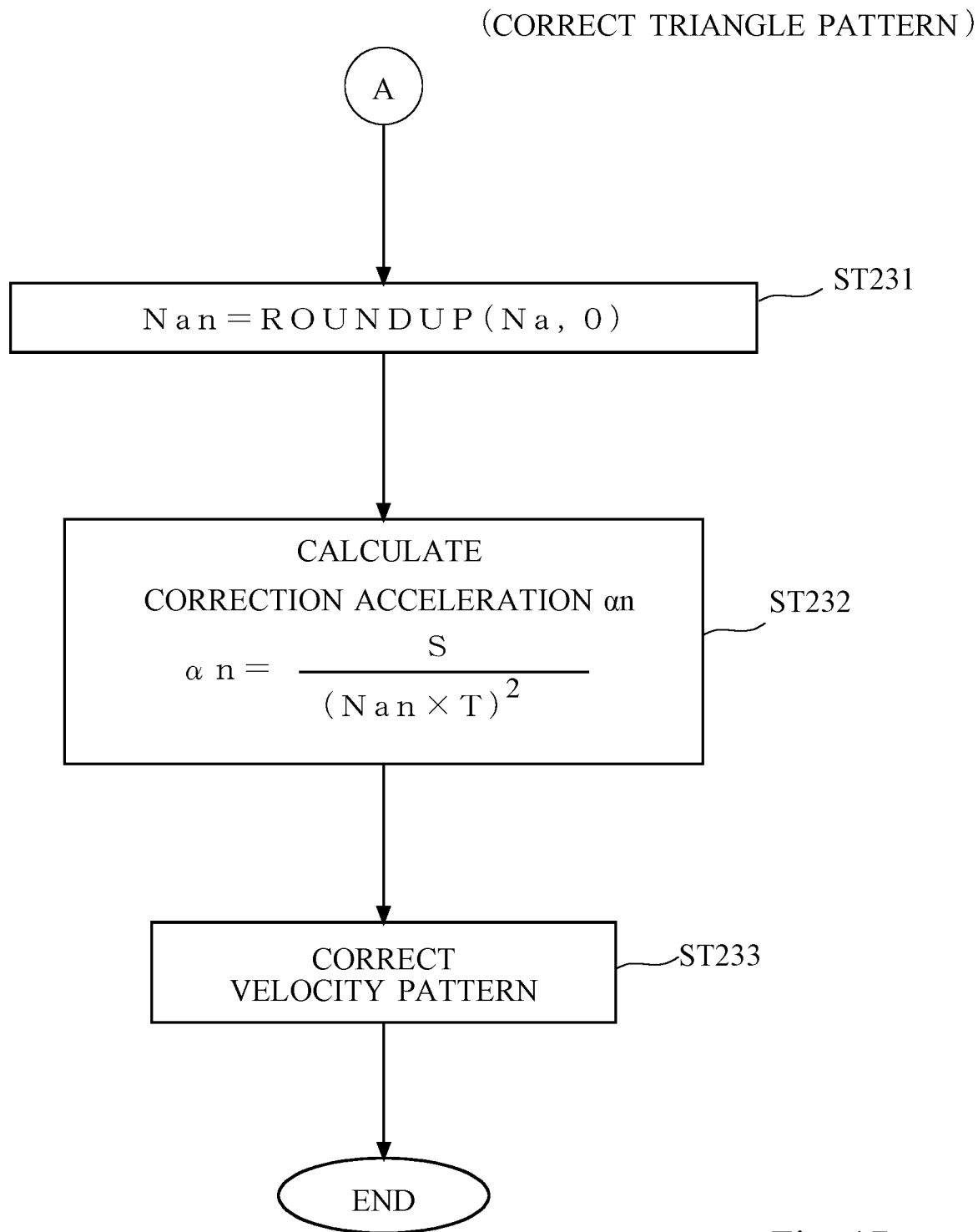
FIG. 17 is a flowchart explaining procedures of velocity pattern correcting processing.

The correcting processing when the velocity pattern is the triangle pattern is described with reference to the flowchart in FIG. 17.

In this case, the relationship between the moving distance S and the acceleration (deceleration) α is expressed as the following expression when the number of times of control sampling in the acceleration section is Na.

$$S=\alpha\times(Na\times T)^2$$

First, the number of times of acceleration Na calculated with the following expression is rounded to an integer value (ST231).

$$Nan=\text{Roundup}(Na, 0)$$

The integer value Nan is the rounded number of times of acceleration.

(The same Value Nan is Used for the Number of Times of Deceleration.)

Thus, acceleration cm corresponding to the integer value Nan is calculated (ST232).

$$S=\alpha n\times(Nan\times T)^2$$

$$\alpha n=S/(Nan\times T)^2$$

This acceleration αn is a correction acceleration.

Figure 18:
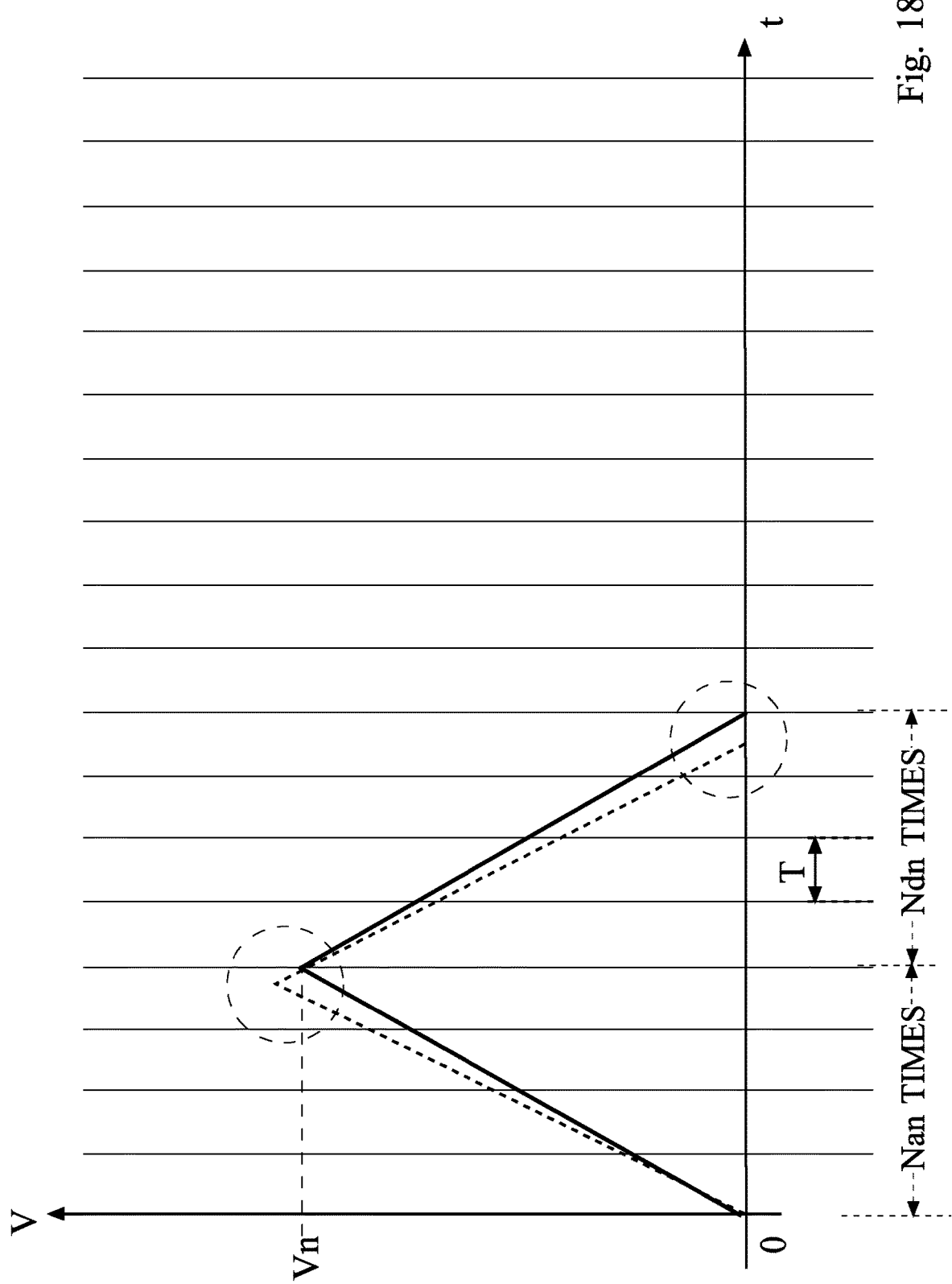
FIG. 18 is a diagram showing a corrected velocity pattern.

When the velocity pattern is corrected using the correction acceleration, the velocity pattern as shown in FIG. 18 is obtained (ST233).

Incidentally, when the intermediate maximum velocity corresponding to the correction acceleration αn is represented as Vn, Vn=αn×Nan×T holds.

As exemplified in FIGS. 16 and 18, the velocity pattern has been corrected to synchronize the acceleration/deceleration changing timing of the velocity pattern with the "control sampling cycle" (ST200).

Then, it is only required to move the probe 230 at the moving speed according to the corrected velocity pattern.

A resultant vector command is generated by the vector command generating unit 348 (ST140), and the drive of the probe is controlled (ST150).

At this time, the velocity pattern is corrected to be synchronized with the "control sampling cycle", and it is possible to highly accurately perform scanning measurement movement without a control lag.

Second Exemplary Embodiment

Next, a second exemplary embodiment of the present invention is described.

In the second exemplary embodiment, although one or both of an initial velocity Vs and a final velocity Ve of a velocity pattern is/are not zero, the velocity pattern is corrected to be synchronized with a control sampling cycle.

In the concept of the second exemplary embodiment, the value of acceleration (or deceleration) is not changed as much as possible.

Instead of this, an adjustment section is inserted to the point switching from an acceleration section to a uniform velocity section, and the point switching from the uniform velocity section to a deceleration section.

The flowcharts in FIGS. 13 and 14 in the first exemplary embodiment are basically the same as those in the second exemplary embodiment.

Figure 19:
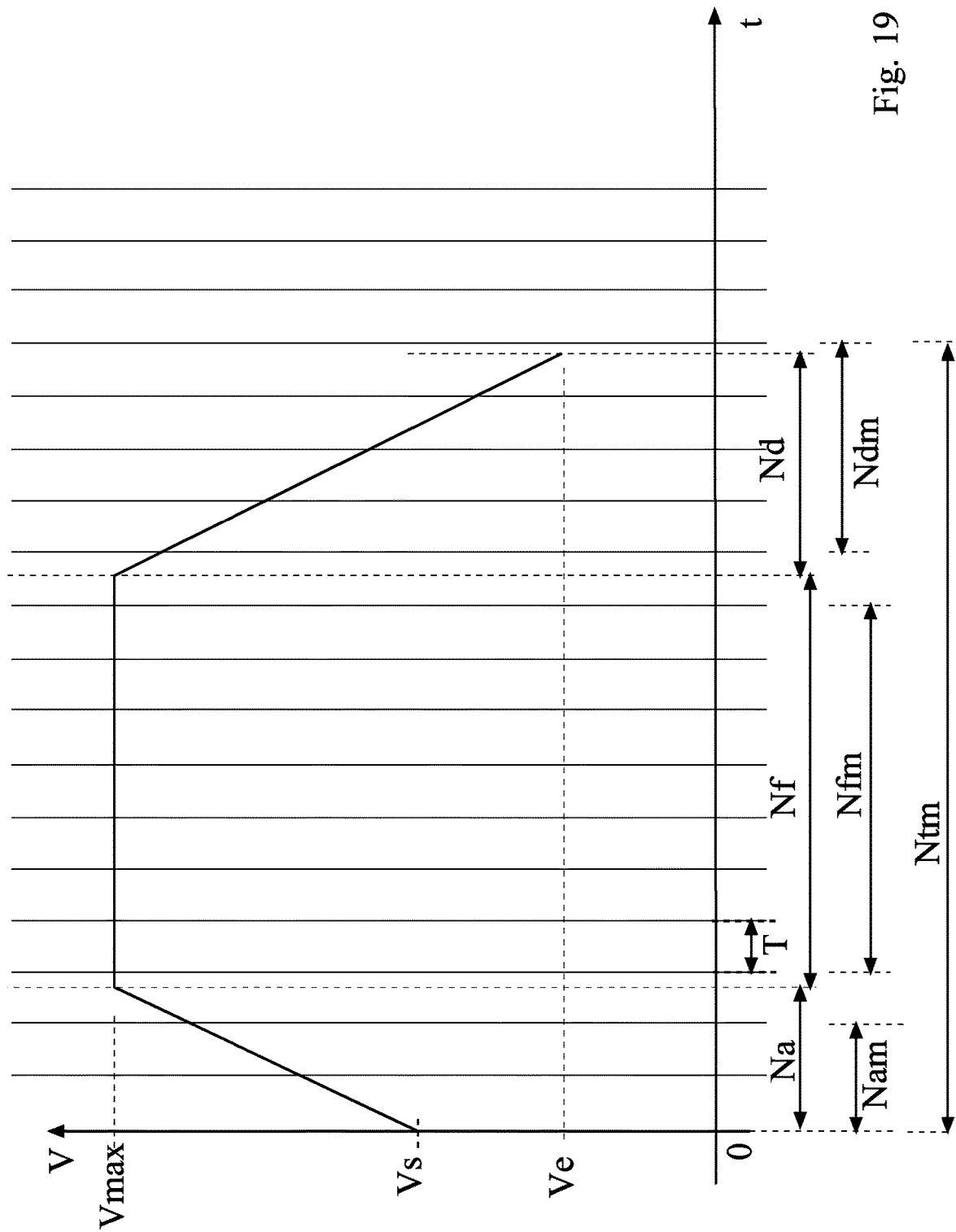
FIG. 19 is a diagram showing an example of a trapezoid pattern in which an initial velocity Vs and a final velocity Ve are not zero.

The case in which a velocity pattern generated by a velocity pattern calculating unit 342 is a trapezoid pattern as shown in, for example, FIG. 19 is described.

In the velocity pattern in FIG. 19, the initial velocity Vs and the final velocity Ve are not zero.

Figure 20:
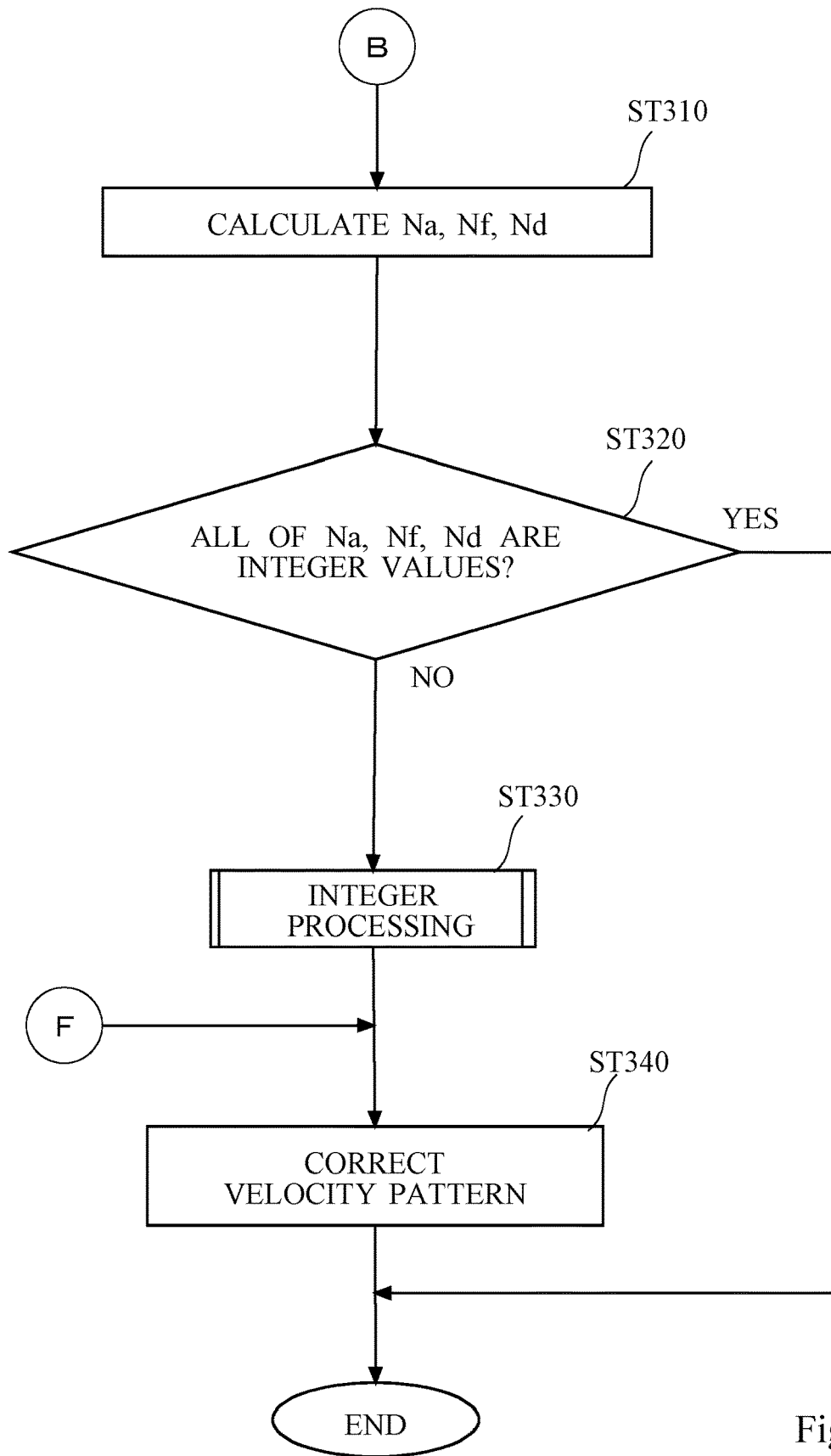
FIG. 20 is a flowchart explaining procedures of velocity pattern correcting processing.

With reference to the flowchart in FIG. 20, processing for adjusting a velocity pattern to be synchronized with a control sampling cycle is sequentially described.

A velocity pattern correcting unit 343 calculates the number of times of control sampling in the acceleration section Na, the number of times of control sampling in the uniform velocity section Nf, and the number of times of control sampling in the deceleration section Nd (ST310).

$$Na=(V\text{max}-Vs)/(\alpha\times T)$$

$$Nd=(V\text{max}-Ve)/(\alpha\times T)$$

The distance of the uniform velocity section is represented as Sf.

$$Nf=Sf/V\text{max}$$

The distance of the uniform velocity section Sf is obtained by subtracting the distance of the acceleration section Sa and the distance of the deceleration section Sd from the total moving distance S.

$$Sf=S-(Sa+Sd)$$

$$2\times\alpha\times Sa=V\text{max}^2-Vs^2$$

$$2\times\alpha\times Sd=V\text{max}^2-Ve^2$$

It is determined whether all the number of times of control sampling in the acceleration section Na, the number of times of control sampling in the uniform velocity section Nf, and the number of times of control sampling in the deceleration section Nd are integer values (ST320).

When all Na, Nf, and Nd are integer values (or in an allowable range in which the values can be treated as integer values), the velocity pattern does not need to be corrected (ST320: YES).

When any one of Na, Nf, and Nd is not an integer value (ST320: NO), the following integer processing is performed (ST330).

The integer processing (ST330) is sequentially described with reference to the flowcharts in FIGS. 21 and 22.

First, the total number of times of control sampling Nt is calculated, and the integer value Ntm is calculated by rounding up the total number of times of control sampling Nt (ST331).

$$Ntm=\text{Roundup}(Nt, 0)$$

$$Nt=Na+Nf+Nd$$

Next, the number of times of control sampling in the acceleration section Na and the number of times of control sampling in the deceleration section Nd are rounded down to be integer values (ST332).

$$Nam=INT(Na)$$

$$Ndm=INT(Nd)$$

Then, the rounded number of times of control sampling in the uniform velocity section Nfm is calculated with the following expression (ST333).

$$Nfm=Ntm-(Nam+Ndm)-2 \qquad \text{(Expression 2)}$$

In Expression 2, "2" is subtracted last.

FIG. 19 schematically shows the relationship among Nfm, Nam, and Ndm.

As shown in FIG. 19, by comparing the rounded total number of times of control sampling Ntm with the sum of Nfm, Nam, and Ndm, the sum of Nfm, Nam, and Ndm is two times less than the total number of times of control sampling Ntm.

Figure 23:
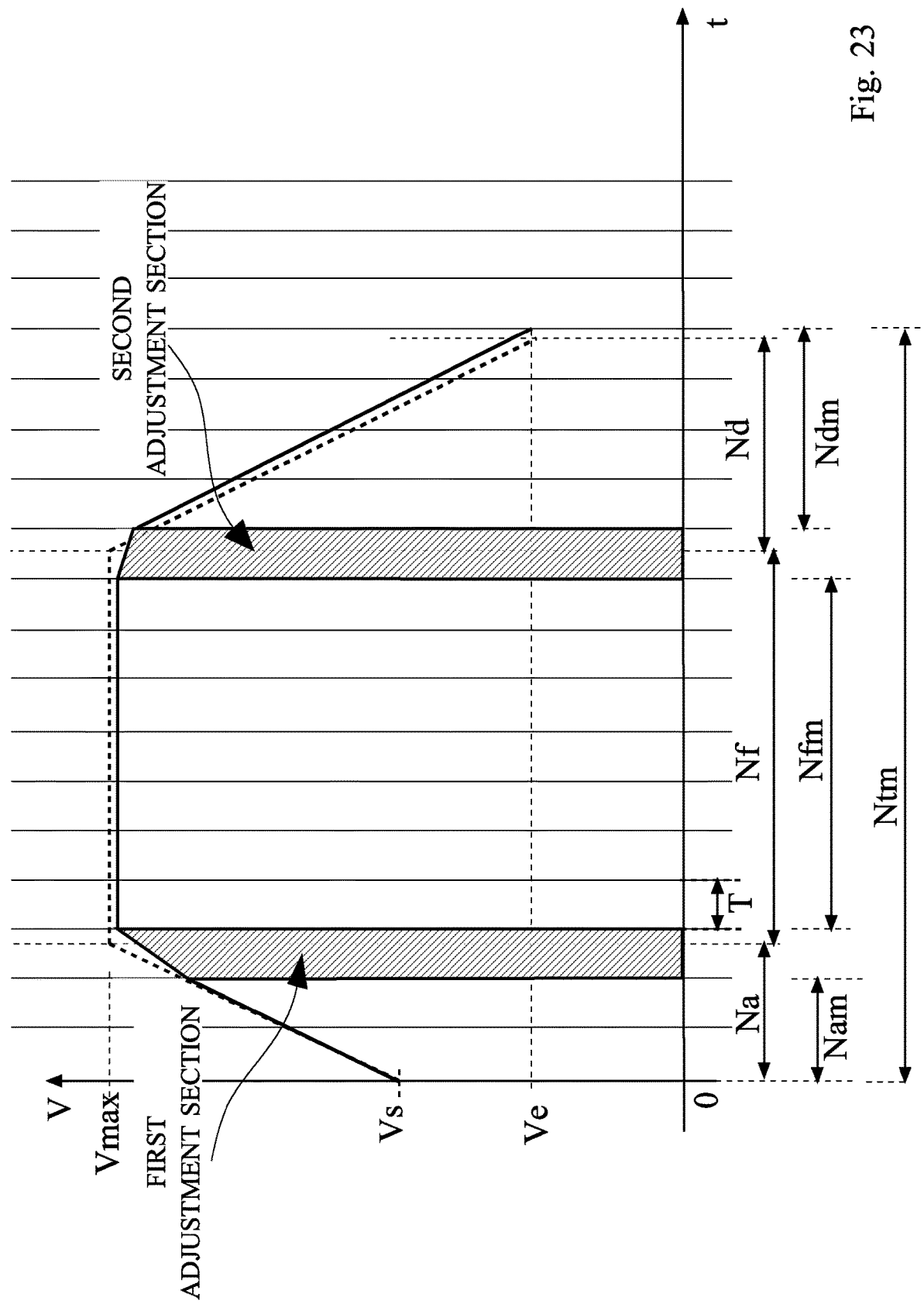
FIG. 23 is a diagram showing a corrected velocity pattern.

To compensate the number of times, an adjustment section for one control sampling cycle is inserted into each of the point switching from the acceleration section to the uniform velocity section, and the point switching from the uniform velocity section to the deceleration section (ST334) (also see FIG. 23).

The adjustment section to be inserted in the point switching from the acceleration section to the uniform velocity section is referred to as a first adjustment section.

The adjustment section to be inserted to the point switching from the uniform velocity section to the deceleration section is referred to as a second adjustment section.

Then, acceleration $\alpha c1$ and $\alpha c2$ in the respective adjustment sections are obtained (ST335).

The acceleration in the first adjustment section is represented as $\alpha c1$.

The acceleration $\alpha c1$ is referred to as a first correction acceleration.

The second correction acceleration in the second adjustment section is represented as $\alpha c2$.

The rounded moving distance of the acceleration section is represented as Sam.

The rounded moving distance of the uniform velocity section is represented as Sfm.

The rounded moving distance of the deceleration section is represented as Sdm.

Furthermore, the moving distance of the first adjustment section is represented as S1$m$, and the moving distance of the second adjustment section is represented as S2$m$.

$$Sam=Vs \times Nam \times T+\alpha \times (Nam \times T)^2/2$$

$$Sfm=Vc \times Nfm \times T$$

where, $Vc=Vs+\alpha \times Nam \times T+\alpha c \times T$ $$Sdm=Ve \times Ndm \times T+\alpha \times (Ndm \times T)^2/2$$

$$S1m=(Vs+\alpha \times Nam \times T) \times T+\alpha c1 \times T^2/2$$

$$S2m=(Ve+\alpha \times Ndm \times T) \times T+\alpha c2 \times T^2/2$$

The total moving distance S is calculated as the following expression.

$$S=Sam+Sfm+Sdm+S1m+S2m$$

The maximum velocity of the corrected velocity pattern is represented as Vm.

Since the velocity change needs to be linked entirely, the following relationship is required.

$$Vm=Vs+\alpha \times Nam \times T+\alpha c1 \times T$$

$$Vm=Ve+\alpha \times Ndm \times T+\alpha c2 \times T$$

With the above relational expressions, the correction acceleration (deceleration) $\alpha c1$ and $\alpha c2$ in the respective adjustment sections can be calculated backward (ST335).

When the correction acceleration $\alpha c1$ and $\alpha c2$ exceed the maximum acceleration $\alpha$ (ST336), an error signal is generated to perform termination processing.

(However, (the Magnitude of) the Correction Acceleration $\alpha c1$ and $\alpha c2$ Calculated with the Above Expressions Should Never Exceed (the Magnitude of) the Acceleration $\alpha$ in Theory)

Next, it is determined whether the first correction acceleration $\alpha c1$ is greater than zero (ST337).

When the first correction acceleration $\alpha c1$ is less than zero, this means that the velocity change in the adjustment section is too large.

In this case (ST337: NO), since the probe accelerates too much in the acceleration section, the acceleration section is shortened (ST338), and re-calculation is performed.

That is, Nam=INT(Na)−1.

Similarly, Ndm=INT(Nd)−1.

Note that, it has been described that the first correction acceleration $\alpha c1$ should be greater than zero in ST337, but this needs one condition.

In the present exemplary embodiment, a predetermined pattern, such as a pattern of acceleration→uniform velocity→deceleration or a pattern of only uniform velocity, is applied as a velocity pattern as exemplified in FIG. 5 (JP 6063161 B), but the velocity pattern is generated so as not to have a section in which the probe suddenly decelerates, that is, so as not to be a pattern of "deceleration→uniform velocity→acceleration".

Thus, when the first correction acceleration in the first adjustment section is less than zero, this means that the probe accelerates too much in the first acceleration section and wastefully decelerates in the first adjustment section.

However, to generate a velocity pattern, a pattern of "deceleration→uniform velocity→acceleration" may be allowed.

In this case, it is required to confirm that the signs of the acceleration in the first acceleration section and the acceleration in the first adjustment section are not reversed.

When the correction acceleration $\alpha c1$ and $\alpha c2$ in the respective adjustment sections are calculated in this manner, this means that the integer processing has been succeeded, and the velocity pattern is corrected (ST340 in FIG. 20).

Returning to the flowchart in FIG. 14, the case in which the velocity pattern is the triangle pattern (FIG. 24) is described (ST220: NO).

The correction method when the velocity pattern is the triangle pattern (FIG. 24) is basically the same as that in the case of the trapezoid pattern, but there is one point to be noted, and the point is described below.

Figure 25:
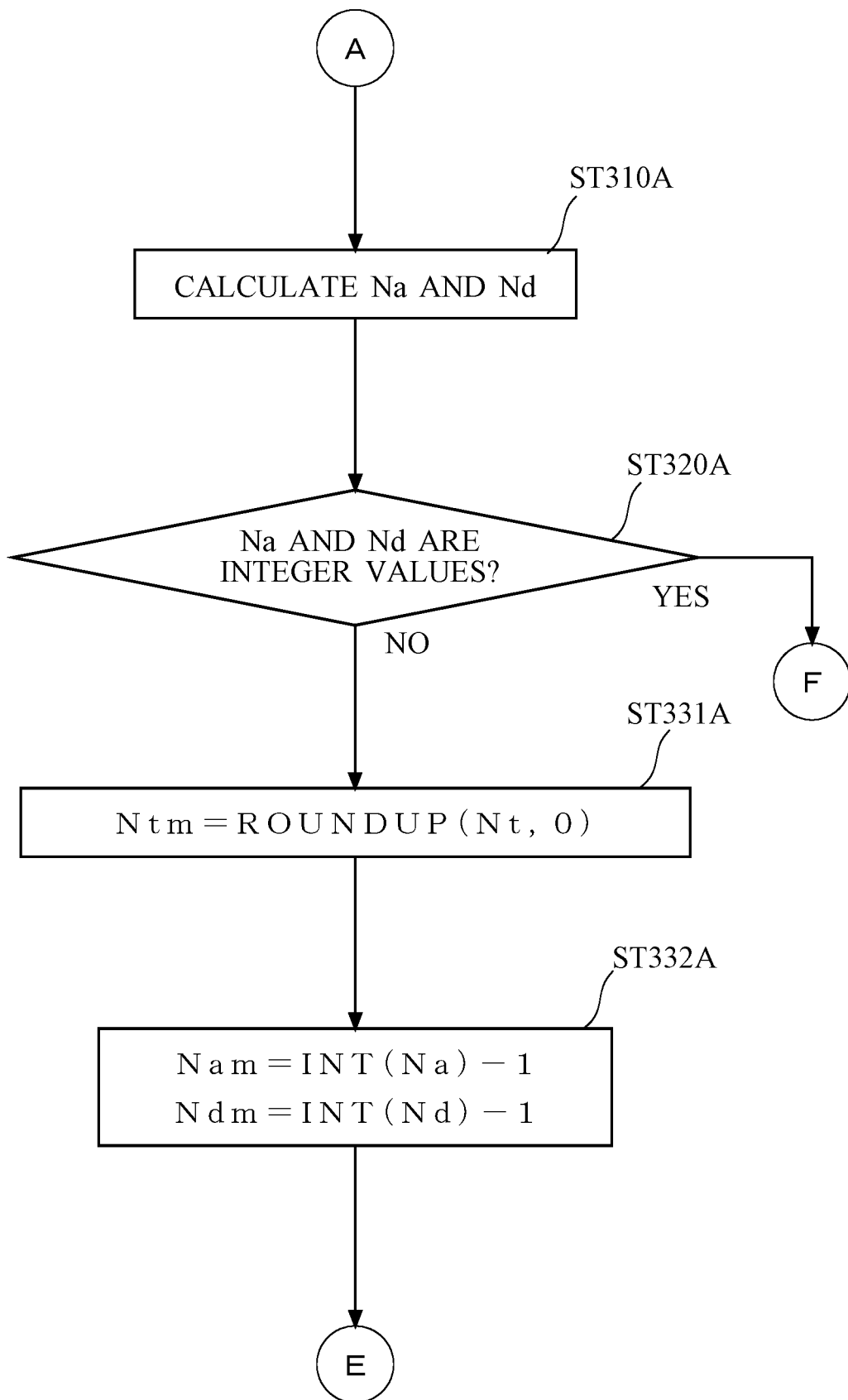
FIG. 25 is a flowchart explaining procedures of velocity pattern correcting processing.

The flowchart in FIG. 25 is referred to.

First, the velocity pattern correcting unit 343 calculates the number of times of control sampling in the acceleration section Na and the number of times of control sampling in the deceleration section Nd (ST310A).

The values Na and Nd are calculated with the following relational expressions.

Here, Vu is the maximum velocity Vu of the triangle velocity pattern, ta is an acceleration time (second), and td is a deceleration time (second).

$$Vu^2 - Vs^2 = 2 \times \alpha \times S$$

$$Vu^2 - Vs^2 = 2 \times \alpha \times S$$

$$S = Sa + Sd$$

$$Sa = Vs \times ta + \alpha \times ta^2/2$$

$$Sd = Ve \times td + \alpha \times td^2/2$$

$$Na = ta/T$$

$$Nd = td/T$$

When either of Na or Nd is not an integer value, the value is rounded (ST320A: NO).

The total number of times of control sampling Nt is calculated, and the integer value Ntm is further calculated by rounding up the total number of times of control sampling Nt (ST331A).

$$Ntm = \text{Roundup}(Nt, 0)$$

$$Nt = Na + Nd$$

The number of times of control sampling in the acceleration section Na and the number of times of control sampling in the deceleration section Nd are rounded down to be integer values, and "1" is subtracted from each value (ST332A).

This is for securing margins for inserting adjustment sections.

Figure 21:
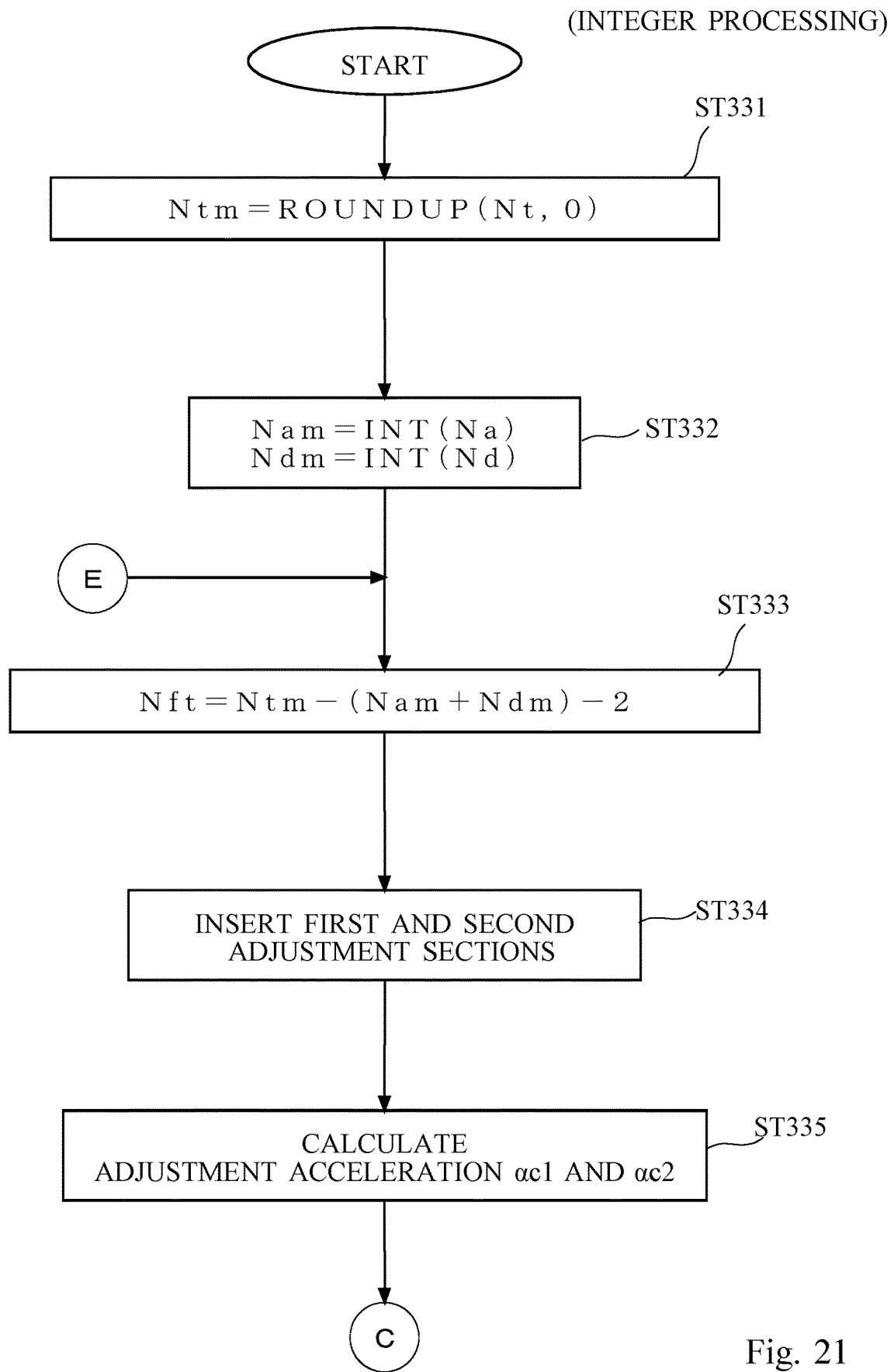
FIG. 21 is a flowchart explaining procedures of integer processing.

This point is the difference from the case of the trapezoid pattern (ST332 in FIG. 21).

$$Nam = INT(Na) - 1$$

$$Ndm = INT(Nd) - 1$$

Figure 22:
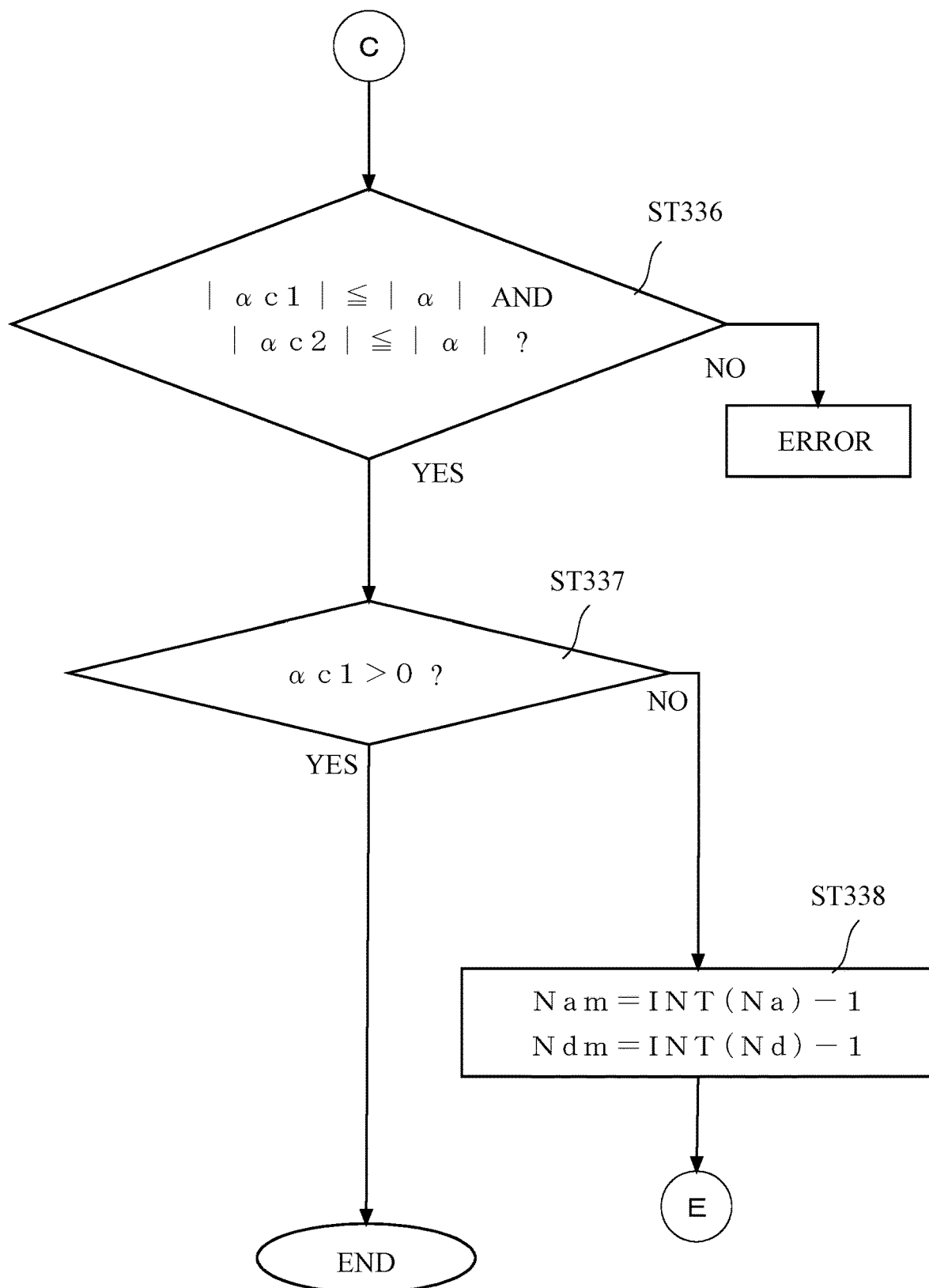
FIG. 22 is a flowchart explaining procedures of integer processing.

The subsequent integer processing is the same as that in the case of the trapezoid pattern, and the subsequent steps are shown in FIGS. 21 and 22.

The adjustment sections are inserted (ST334), and the correction acceleration $\alpha c1$ and $\alpha c2$ are calculated (ST335).

Figure 26:
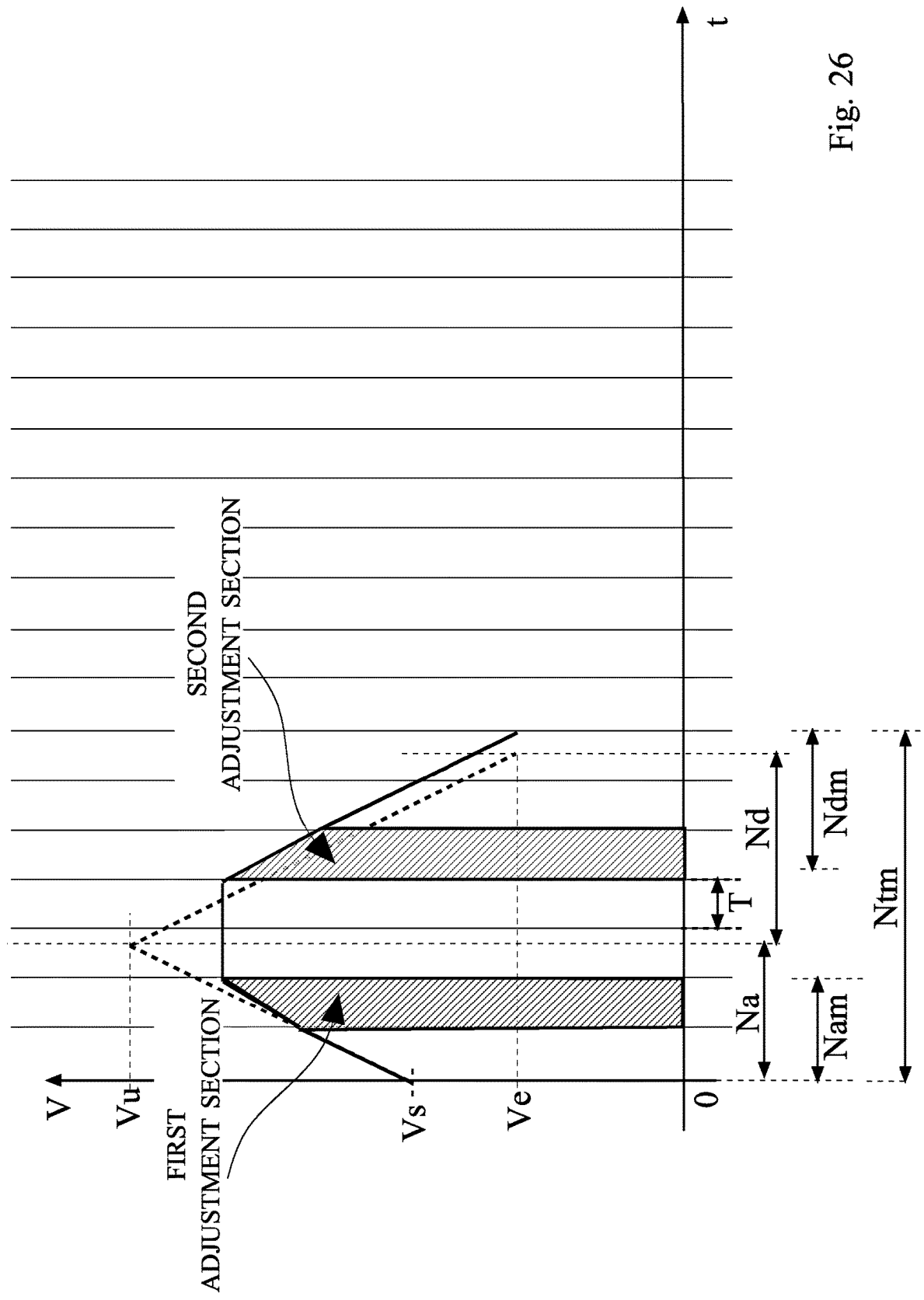
FIG. 26 is a diagram showing a corrected velocity pattern.

Then, the velocity pattern synchronized with the control sampling cycle is obtained as exemplified in FIG. 26.

As exemplified in FIGS. 23 and 26, the velocity pattern has been corrected so that the acceleration/deceleration changing timing of the velocity pattern is synchronized with the "control sampling cycle" (ST200), and, then, it is only required for the probe to move at the moving speed according to the corrected velocity pattern.

A resultant vector command is generated by the vector command generating unit 348 (ST140 in FIG. 13), and the drive of the moving mechanism 220 is controlled so that the probe 230 performs scanning movement (ST150).

At this time, since the velocity pattern is corrected to be synchronized with the "control sampling cycle", it is possible to highly accurately perform the scanning measurement movement without a control lag.

According to the second exemplary embodiment, it is possible to correct a velocity pattern in which the initial velocity or the final velocity is not zero to be synchronized with a "control sampling cycle".

Third Exemplary Embodiment

In a third exemplary embodiment, S-shaped acceleration/deceleration processing is described.

In the above calculation of a velocity pattern, acceleration is assumed to be constant, and thus velocity with respect to time is expressed by a linear function.

However, the actual drive control of a machine is performed to be smooth so that the probe gradually accelerates and gradually decelerates.

That is, S-shaped acceleration/deceleration processing is performed.

Figure 24:
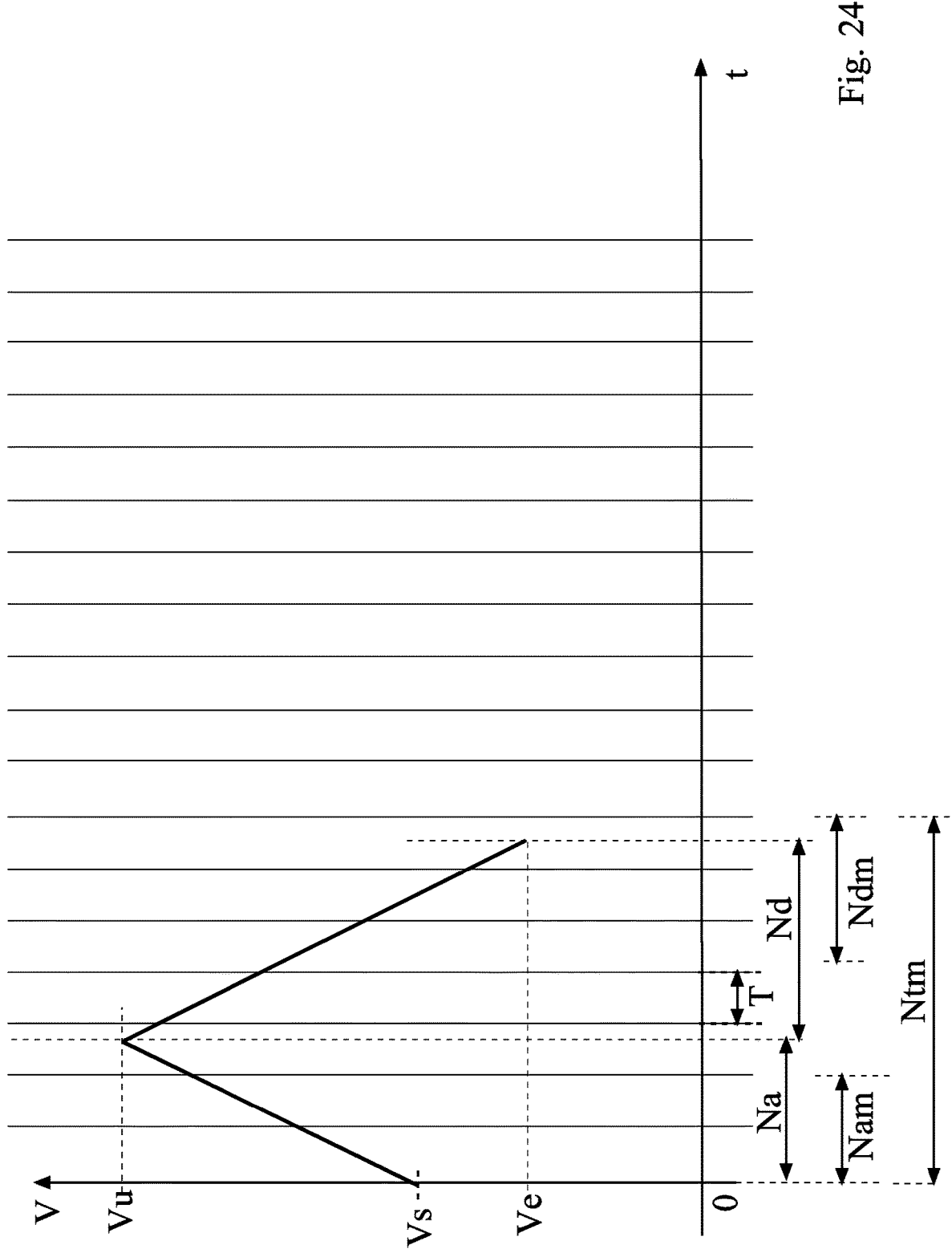
FIG. 24 is a diagram showing an example of a triangle pattern in which an initial velocity Vs and a final velocity Ve are not zero.

After the velocity pattern as shown in FIG. 19 or 24, the method for performing the S-shaped acceleration/deceleration processing synchronized with the velocity pattern has been proposed by the applicant (for example, JP 6050636 B).

Figure 27:
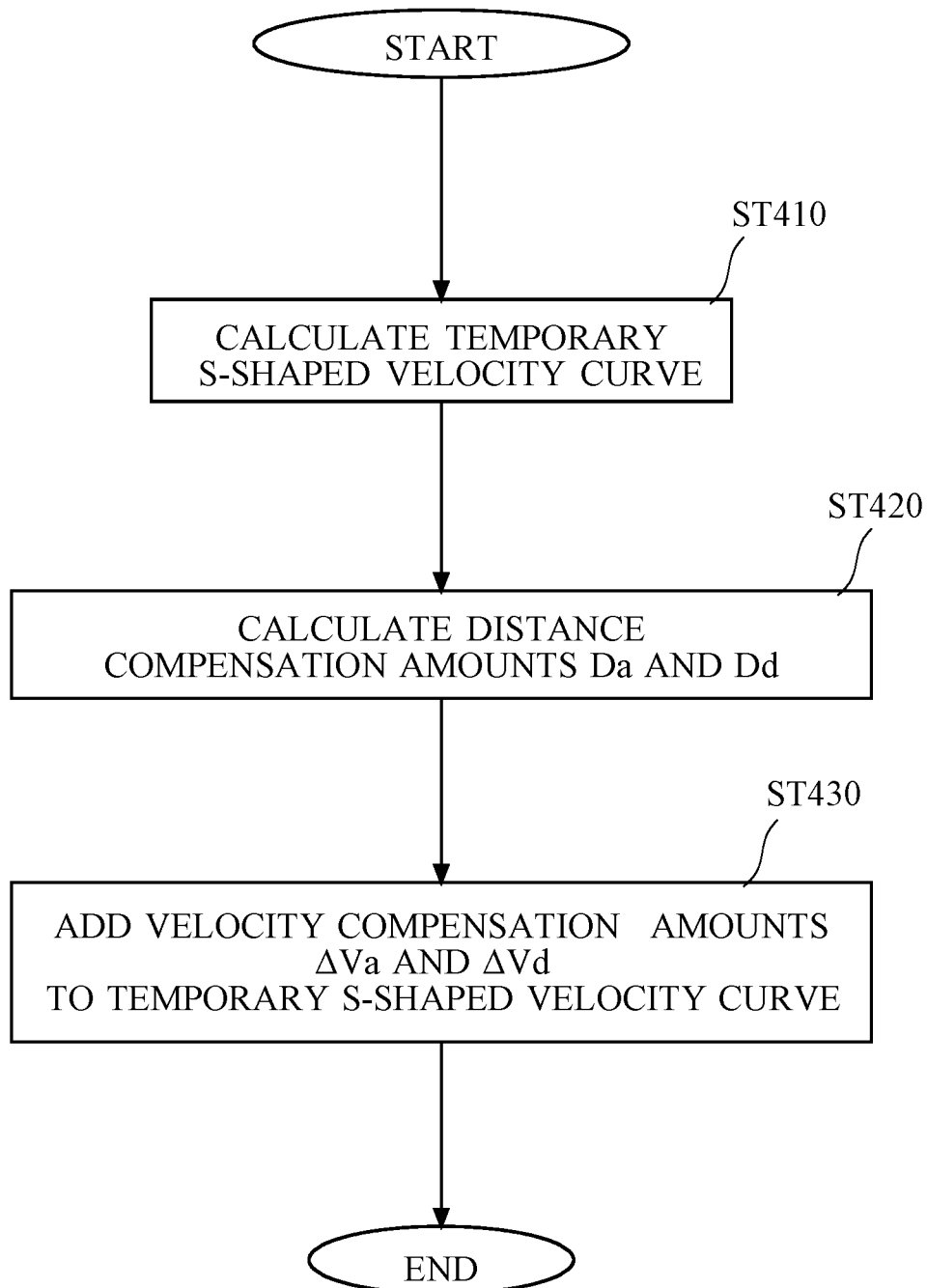
FIG. 27 is a flowchart explaining S-shaped acceleration/deceleration processing.

In the third exemplary embodiment, S-shaped acceleration/deceleration processing when the number of times of control sampling is rounded similarly to the second exemplary embodiment (FIG. 23 or 26) is described with reference to the flowchart in FIG. 27.

Acceleration/deceleration processing in the third exemplary embodiment is performed by an acceleration/deceleration adjusting unit 344 (FIG. 10).

It is assumed that a correction velocity pattern as shown in FIG. 23 is obtained after the velocity pattern in FIG. 19 is corrected by the processing in the second exemplary embodiment.

Figure 28:
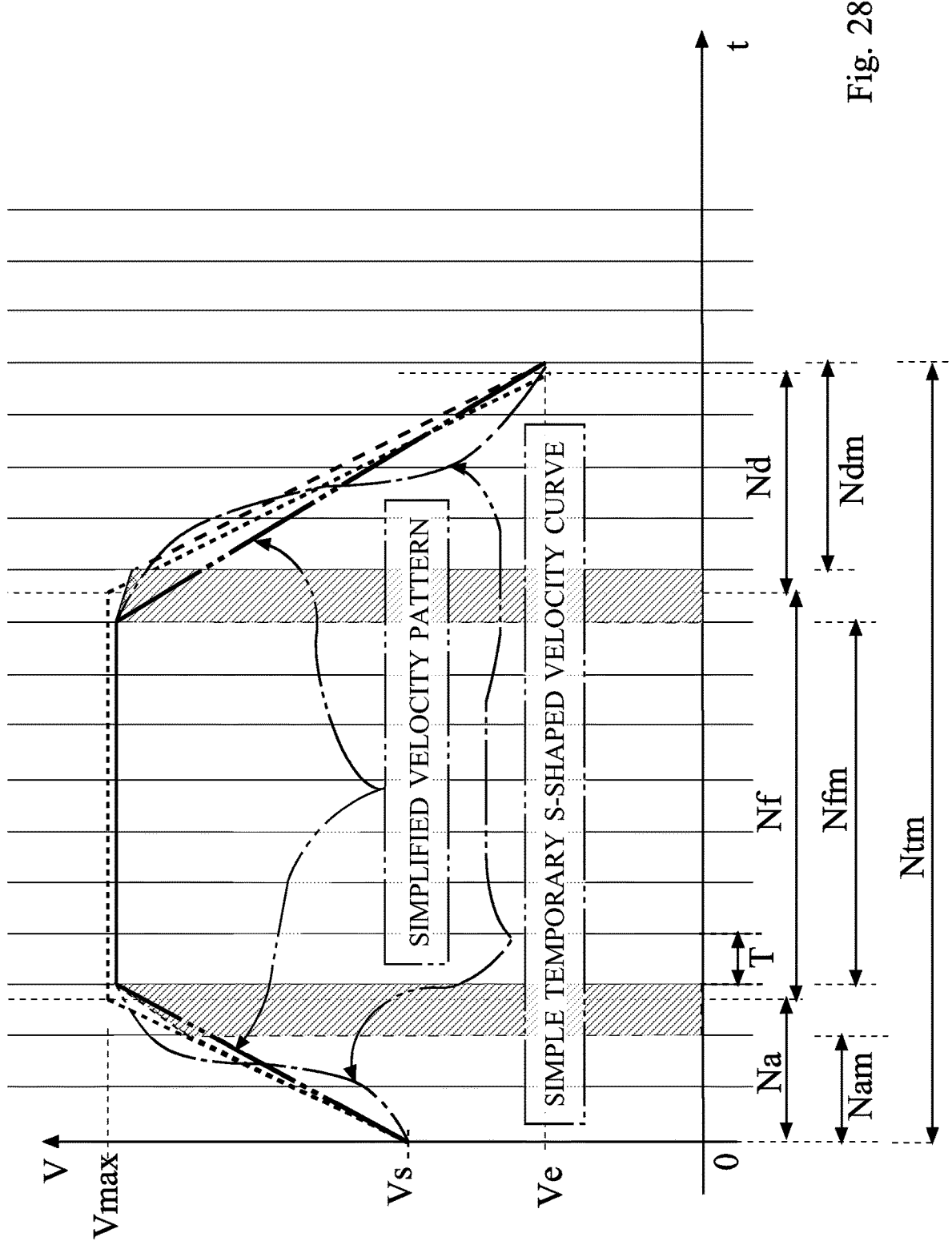
FIG. 28 is a diagram showing an example of a temporary S-shaped velocity curve in contrast with a simplified correction velocity pattern.

First, the simple case in which a probe 230 monotonously accelerates from an initial velocity Vs in an acceleration section, reaches a correction maximum velocity Vm, monotonously decelerates from the correction maximum velocity Vm in a deceleration section, and reaches a final velocity Ve is considered (see FIG. 28).

A temporary S-shaped velocity curve for the simplified correction velocity pattern is calculated (ST410).

The method for converting such a simple linear acceleration/deceleration pattern into an S-shaped velocity curve by the S-shaped acceleration/deceleration processing is known.

Figure 29:
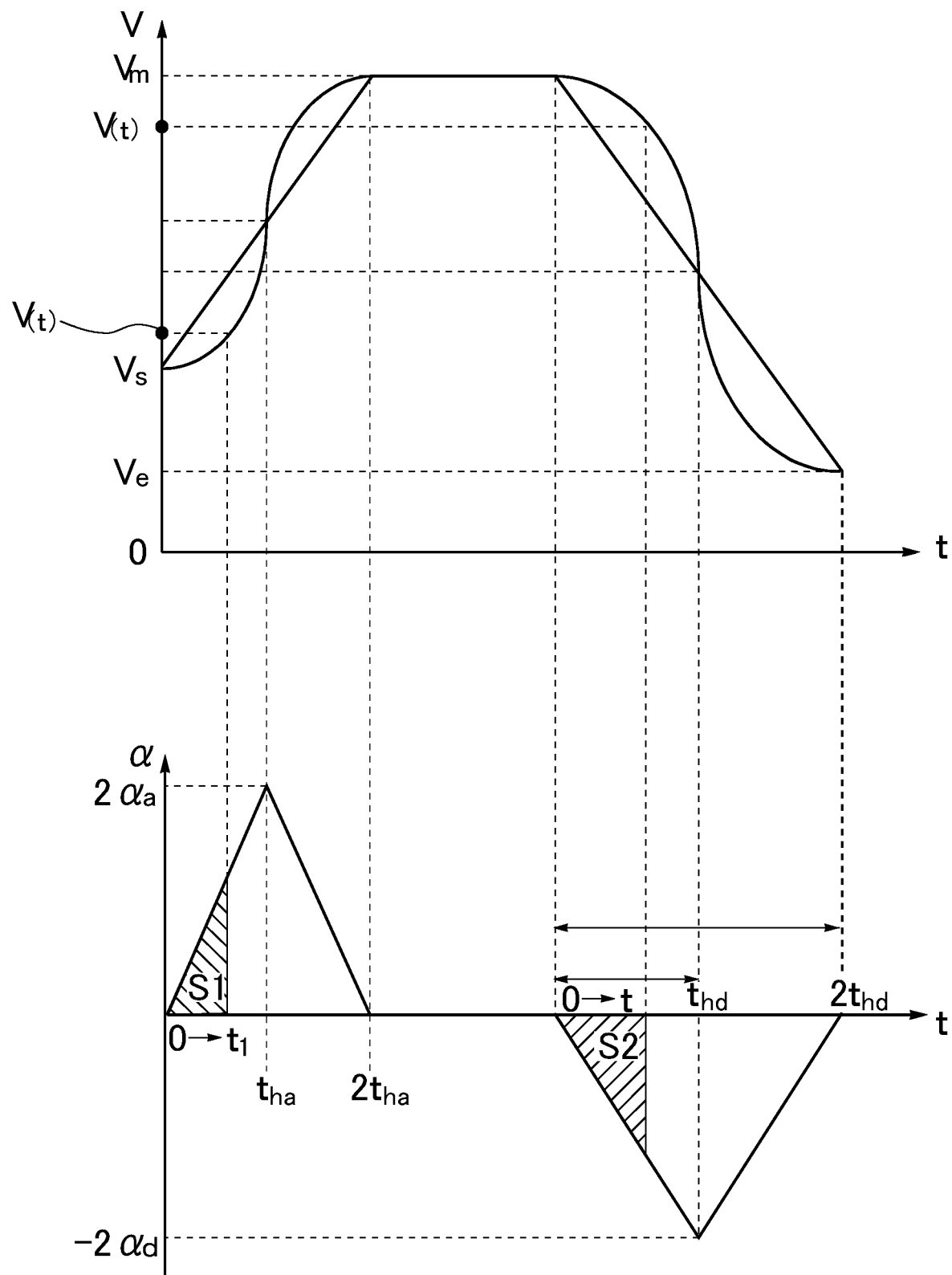
FIG. 29 is a diagram explaining a method for obtaining an S-shaped velocity curve from a linear acceleration/deceleration pattern by S-shaped acceleration/deceleration processing.
Figure 30:
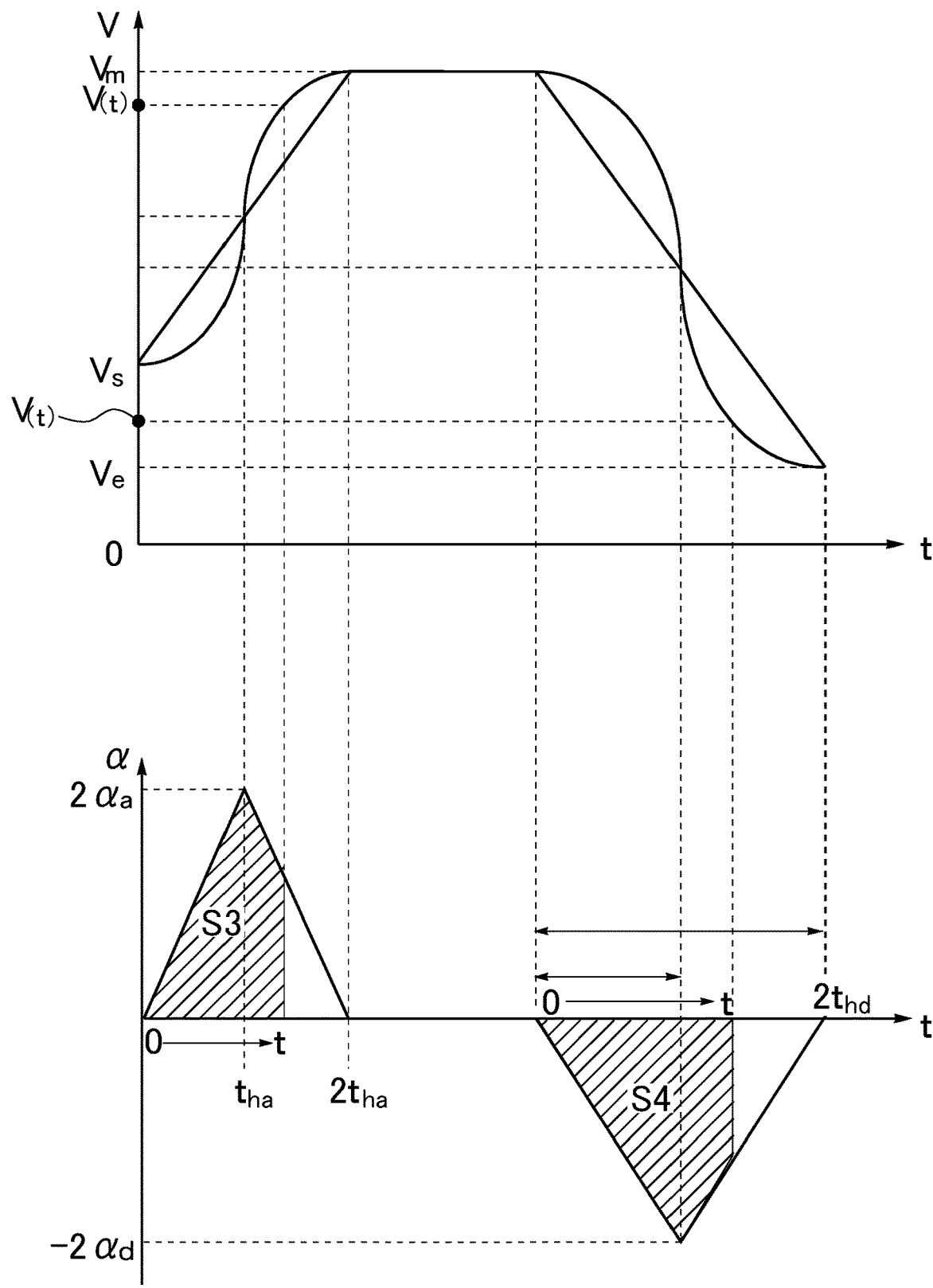
FIG. 30 is a diagram explaining a method for obtaining an S-shaped velocity curve from a linear acceleration/deceleration pattern by S-shaped acceleration/deceleration processing.

For example, FIGS. 29 and 30 is referred to in order for the method to be understood.

First, the acceleration when the probe 230 accelerates from the initial velocity Vs to the correction maximum velocity Vm during the time of $(Nam+1) \times T$ according to a pattern expressed by a linear function is represented as $\alpha a$.

In addition, to simplify the expression, time tha is represented as $2 \times tha = (Nam+1) \times T$.

Then, the velocity curve is assumed to be a quadratic curve, the velocity V(t) at time t in $0 < t < tha$ is expressed by the following expression (FIG. 29).

$$V(t) = Vs + (\alpha a/tha) \times t^2$$

Similarly, the velocity V(t) at time t in $tha < t < 2tha$ is expressed by the following expression (FIG. 30).

$$V(t) = Vm - (\alpha a/tha) \times (2tha - t)^2$$

The velocity in the S-shaped velocity curve at each time t is calculated.

Next, distance compensation amounts Da and Dd are calculated.

In ST410, the temporary S-shaped velocity curve for the simplified correction velocity pattern is calculated.

Figure 31:
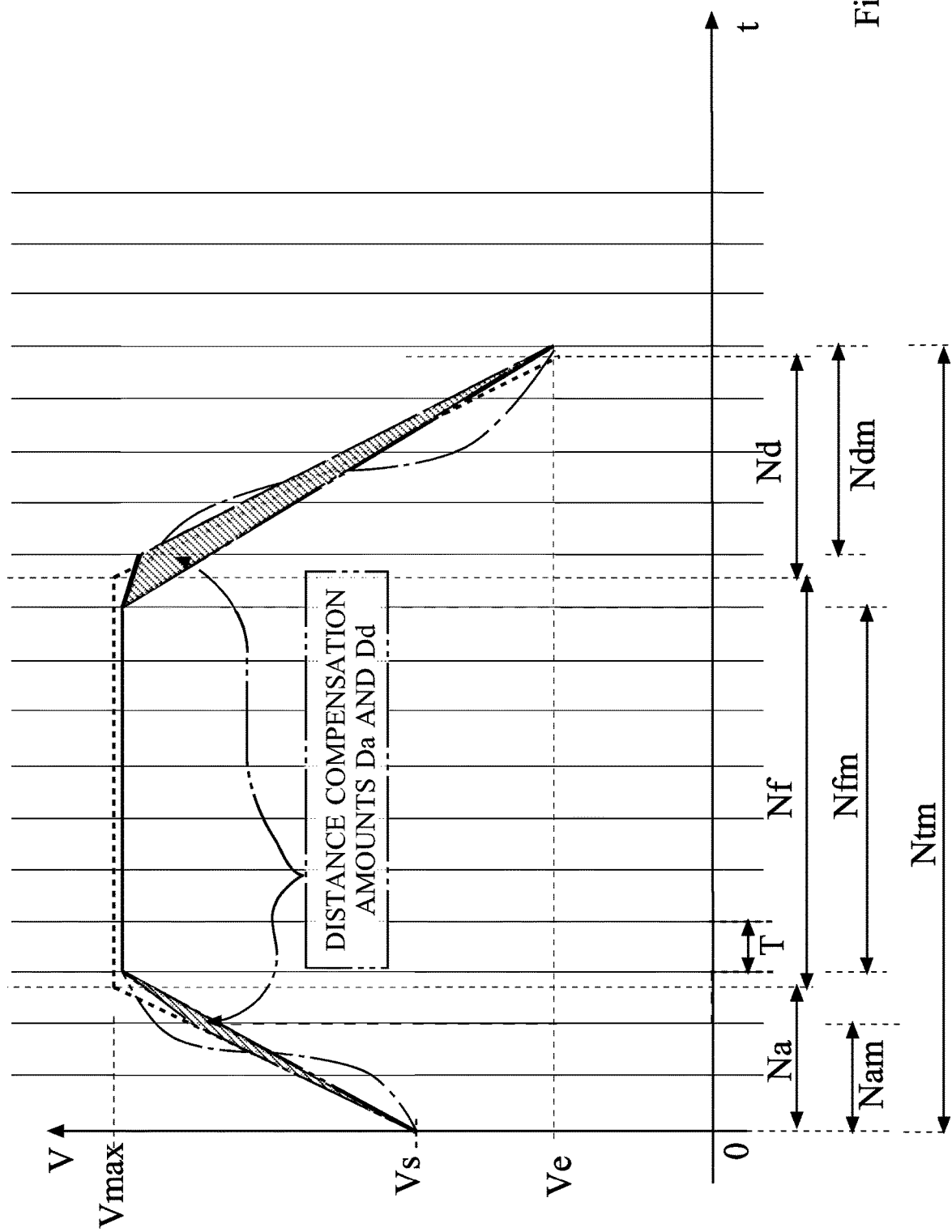
FIG. 31 is a diagram showing an example of a distance compensation amount.

Thus, omitted portions are generated (FIG. 31).

The acceleration section and the first adjustment section are considered, and the distance compensation amount Da is expressed by the following expression.

$$Da=\{(\alpha-\alpha a)\times(Nam\times T)^2+(\alpha c1-\alpha a)\times T^2\}/2$$

As described above, αa represents the acceleration when the probe 230 accelerates from the initial velocity Vs to the correction maximum velocity Vm according to the pattern expressed by the linear function.

Similarly, the deceleration section and the second adjustment section are considered, and the distance compensation amount Dd is expressed by the following expression.

$$Dd=\{-(\alpha-\alpha d)\times(Ndm\times T)^2+(\alpha c2-\alpha a)\times T^2\}/2$$

Note that, ad represents the deceleration when the probe 230 decelerates from the correction maximum velocity Vm to the final velocity Ve according to the pattern expressed by the linear function.

The velocity for these compensation amounts Da and Dd is insufficient, and these amounts is added to the temporary S-shaped velocity curve (FIG. 32).

For example, in the acceleration section, the velocity obtained by the velocity compensation amount ΔVa=Da/(Nam×T) is added to the temporary S-shaped velocity curve per control sampling.

Similarly, in the deceleration section, the velocity obtained by the velocity compensation amount ΔVd=Dd/(Ndm×T) is added to the temporary S-shaped velocity curve per control sampling.

(The Velocity Curve Obtained in this Manner is No Longer a Quadratic Curve.)

The velocity curve of the temporary S-shaped velocity curve has been calculated in this manner, and it is only required to move the probe 230 at the moving speed according to the velocity pattern.

The velocity pattern is corrected to be synchronized with the "control sampling cycle", and it is possible to highly accurately perform scanning measurement movement with smooth acceleration/deceleration according to the velocity curve of the temporary S-shaped velocity curve without a control lag.

Note that, the present invention is not limited to the above embodiments, and can be appropriately changed without deviating from the scope.

The invention claimed is:

1. A method for controlling a shape measuring apparatus that moves a probe along a surface of an object to be measured to measure a shape of the object to be measured, the method comprising:
    generating, based on a shape of a movement path set based on preliminarily obtained shape data of the object to be measured, a velocity pattern for the probe to move along the movement path;
    determining whether a velocity changing timing of the velocity pattern is synchronized with a control sampling cycle of the shape measuring apparatus; and
    correcting, when the velocity changing timing of the velocity pattern is not synchronized with the control sampling cycle, the velocity pattern such that the velocity changing timing of the velocity pattern is synchronized with the control sampling cycle of the shape measuring apparatus.

2. The method for controlling the shape measuring apparatus according to claim 1, wherein, the correcting the velocity pattern to be synchronized with the control sampling cycle comprising:
    when the velocity pattern is a triangle pattern,
    setting the number of times of control sampling in an acceleration section before the correction as Na, the number of times of control sampling in a deceleration section before the correction as Nd, and the total number of times of control sampling before the correction as Nt;
    calculating the total number of times of control sampling after the correction Ntm by rounding up, after the decimal points, the total number of times of control sampling before the correction Nt;
    calculating the number of times of control sampling in the acceleration section after the correction Nam by subtracting 1 from the value obtained by rounding up the value Na;
    calculating the number of times of control sampling in the deceleration section after the correction Ndm by subtracting 1 from the value obtained by rounding up the value Nd;
    calculating the number of times of control sampling in the uniform velocity section after the correction Nft with Ntm −(Nam +Ndm) −2; and
    inserting an adjustment section for one control sampling cycle between the acceleration section and the uniform velocity section and between the uniform velocity section and the deceleration section.

3. The method for controlling the shape measuring apparatus according to claim 1, wherein, the correcting the velocity pattern to be synchronized with the control sampling cycle comprising:
    when an initial velocity and a final velocity of the velocity pattern are zero, and when the velocity pattern is a trapezoid pattern,
    calculating a value Nm by adding the number of times of control sampling in an acceleration section Na to the number of times of control sampling in a uniform velocity section Nf and rounding up the sum after the decimal points;
    calculating a correction maximum velocity Vm, which is a velocity in the uniform velocity section, with S/(T ×Nm) where S is a total moving distance, and T is one control sampling cycle;
    calculating a value Nam, which is a rounded value of the number of times of control sampling in the acceleration section Na, with ROUNDUP (Na', 0) where Na'=Vm/(T ×α), and α is acceleration before the correction; and
    setting the number of times of control sampling in the uniform velocity section Nfm as Nfm =Nm ×Nam.

4. The method for controlling the shape measuring apparatus according to claim 1, wherein, the correcting the velocity pattern to be synchronized with the control sampling cycle comprising:
    when an initial velocity and a final velocity of the velocity pattern are zero, and when the velocity pattern is a triangle pattern, the rounded number of times of control sampling in an acceleration section Nan is calculated with the following expression;

$$Nan = \text{Roundup}(Na, 0)$$

where Na is $S = \alpha \times (Na \times T)^2$, S is a total moving distance, $\alpha$ is acceleration before the correction, and T is one control sampling cycle.

5. The method for controlling the shape measuring apparatus according to claim 1, wherein, the correcting the velocity pattern to be synchronized with the control sampling cycle comprising:

when the velocity pattern is a trapezoid pattern, setting the number of times of control sampling in an acceleration section before the correction as Na, the number of times of control sampling in a deceleration section before the correction as Nd, the number of times of control sampling in a uniform velocity section before the correction as Nf, and the total number of times of control sampling before the correction as Nt;

calculating the total number of times of control sampling after the correction Ntm by rounding up, after the decimal points, the total number of times of control sampling before the correction Nt;

calculating the number of times of control sampling in the acceleration section after the correction Nam by rounding up the value Na;

calculating the number of times of control sampling in the deceleration section after the correction Ndm by rounding up the value Nd;

calculating the number of times of control sampling in the uniform velocity section after the correction Nft with Ntm −(Nam +Ndm) −2; and inserting an adjustment section for one control sampling cycle between the acceleration section and the uniform velocity section and between the uniform velocity section and the deceleration section.

6. The method for controlling the shape measuring apparatus according to claim 5, wherein, the correcting the velocity pattern to be synchronized with the control sampling cycle comprising:

when respective signs of acceleration in the adjustment section and acceleration before the correction are reversed, "1" is subtracted from the value Nam, and "1" is subtracted from the value Ndm.

* * * * *